US012346041B2

(12) United States Patent
Toba et al.

(10) Patent No.: US 12,346,041 B2
(45) Date of Patent: Jul. 1, 2025

(54) IMAGE FORMING APPARATUS AND IMAGE FORMING SYSTEM

(71) Applicant: CANON KABUSHIKI KAISHA, Tokyo (JP)

(72) Inventors: Shinjiro Toba, Kanagawa (JP); Hiroshi Takarada, Kanagawa (JP); Hiroyuki Munetsugu, Kanagawa (JP); Goshi Ozaki, Kanagawa (JP); Sohta Sugimoto, Kanagawa (JP); Mitsuhiro Sato, Tokyo (JP); Shinichi Nishida, Kanagawa (JP); Yuichi Fukui, Kanagawa (JP); Yukio Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/628,926

(22) Filed: Apr. 8, 2024

(65) Prior Publication Data

US 2024/0255866 A1 Aug. 1, 2024

Related U.S. Application Data

(63) Continuation of application No. 17/897,565, filed on Aug. 29, 2022, now Pat. No. 11,977,344.

(30) Foreign Application Priority Data

Aug. 31, 2021 (JP) ................................ 2021-141732
Dec. 20, 2021 (JP) ................................ 2021-205884

(51) Int. Cl.

| | |
|---|---|
| *G03G 15/08* | (2006.01) |
| *G03G 21/16* | (2006.01) |
| *G03G 21/20* | (2006.01) |

(52) U.S. Cl.
CPC ..... *G03G 15/0886* (2013.01); *G03G 15/0808* (2013.01); *G03G 15/0868* (2013.01);
(Continued)

(58) Field of Classification Search
CPC .......... G03G 15/0808; G03G 15/0868; G03G 15/0872; G03G 15/0875; G03G 15/0877;
(Continued)

(56) References Cited

U.S. PATENT DOCUMENTS 4,041,902 A 8/1977 Jugle et al.
7,574,162 B2 8/2009 Yamane
(Continued)

FOREIGN PATENT DOCUMENTS

EP 3762784 A1 1/2021
JP 2010-055037 A 3/2010
(Continued)

OTHER PUBLICATIONS

Extended European Search Report dated Feb. 1, 2023, in European Application No. 22191882.4.
(Continued)

*Primary Examiner* — Sophia S Chen
(74) *Attorney, Agent, or Firm* — Venable LLP

(57) ABSTRACT

An image forming apparatus to which a toner container is detachably mountable includes a mounting portion to which the toner container is detachably mountable and which includes a receiving port for receiving toner supplied from the toner container, a passage for permitting passing of the toner received through the receiving port and provided with a through hole, and a filter portion provided so as to cover the through hole and for permitting passing of air; and an accommodating portion configured to accommodate the toner received through the receiving port. At least a part of the through hole overlaps with the receiving port as viewed
(Continued)

in a horizontal direction perpendicular to a direction of gravitation.

15 Claims, 20 Drawing Sheets

(52) U.S. Cl.
CPC ..... *G03G 15/0872* (2013.01); *G03G 15/0875* (2013.01); *G03G 21/1676* (2013.01); *G03G 21/206* (2013.01); *G03G 2215/0668* (2013.01); *G03G 2215/0692* (2013.01)

(58) Field of Classification Search
CPC ........... G03G 15/0886; G03G 21/1676; G03G 21/206; G03G 2215/0668; G03G 2215/0692
See application file for complete search history.

(56) References Cited

U.S. PATENT DOCUMENTS

| | | | |
|---|---|---|---|
| 8,086,143 | B2 | 12/2011 | Nagayama et al. |
| 9,411,309 | B1 | 8/2016 | Kamano et al. |
| 9,417,601 | B1 | 8/2016 | Fukumuro |
| 9,983,513 | B2 | 5/2018 | Nagashima et al. |
| 10,108,123 | B2 | 10/2018 | Ito et al. |
| 10,379,462 | B2 | 8/2019 | Okino et al. |
| 10,663,881 | B1 | 5/2020 | Wakai et al. |
| 11,126,113 | B2 | 9/2021 | Lee et al. |
| 11,269,266 | B2 | 3/2022 | Kobayashi et al. |
| 11,422,484 | B2 | 8/2022 | Wada et al. |
| 12,111,601 | B2 | 10/2024 | Wada et al. |
| 2009/0074450 | A1 | 3/2009 | Nagayama et al. |
| 2017/0285523 | A1 | 10/2017 | Itabashi |
| 2022/0155708 | A1 | 5/2022 | Sato et al. |
| 2022/0373961 | A1 | 11/2022 | Nogami et al. |

FOREIGN PATENT DOCUMENTS

| | | | |
|---|---|---|---|
| JP | 2017-211412 | A | 11/2017 |
| JP | 2018-060177 | A | 4/2018 |
| JP | 2020-074048 | A | 5/2020 |
| JP | 2020-101580 | A | 7/2020 |
| JP | 2020-154299 | A | 9/2020 |
| JP | 2021-026200 | A | 2/2021 |
| JP | 2021-026218 | A | 2/2021 |
| JP | 2021-063970 | A | 4/2021 |
| KR | 10-2013-0118872 | A | 10/2013 |
| KR | 10-2020-0012213 | A | 2/2020 |
| KR | 10-2021-0043470 | A | 4/2021 |
| WO | 2020/189550 | A1 | 9/2020 |

OTHER PUBLICATIONS

Office Action dated May 26, 2023, in Indian Patent Application No. 202244047578.
Office Action dated Nov. 4, 2024, in Korean Patent Application No. 10-2022-0104790.
Extended European Search Report dated Jan. 30, 2025, in European Patent Application No. 22191882.4.
Office Action dated May 9, 2025, in Korean Patent Application No. 10-2022-0104790.
Office Action dated May 20, 2025, in Japanese Patent Application No. 2025-036082.

(a)

(b)

(a)

(b)

IMAGE FORMING APPARATUS AND IMAGE FORMING SYSTEM

FIELD OF THE INVENTION AND RELATED ART

The present invention relates to an image forming apparatus and an image forming system, in which an image is formed on a sheet.

In general, an image forming apparatus of an electrophotographic type forms an image by transferring a toner image, formed on a surface of a photosensitive drum, onto a transfer material as a transfer medium. Further, as a toner supplying type, for example, a process cartridge type or a toner supplying (replenishing) type has been known. The process cartridge type is a type in which the photosensitive drum and a developing (developer) container are integrally assembled as a process cartridge in which the process cartridge is exchanged with a new one when toner runs out.

On the other hand, the toner supplying type is a type in which when the toner runs out, toner is newly supplied (replenished) to a developing container. For example, in Japanese Laid-Open Patent Application (JP-A) 2021-26218, an image forming apparatus in which the toner is supplied to the developing container by using a toner pack mountable to a mounting portion provided on the developing container is disclosed.

However, as regards the toner pack described in JP-A 2021-26218, a bag body of the toner pack is compressed (squeezed) by a user and thus the toner is discharged, but at this time, air is discharged together with the toner from the toner pack. When the air is discharged from the toner pack, internal pressure of the developing container increases, so that a toner supplying property lowers in some cases.

SUMMARY OF THE INVENTION

According to an aspect of the present invention, there is provided an image forming apparatus to which a toner container is detachably mountable, comprising: a mounting portion to which the toner container is detachably mountable and which includes a receiving port configured to receive toner supplied from the toner container, a passage configured to permit passing of the toner received through the receiving port and provided with a through hole, and a filter portion provided so as to cover the through hole and configured to permit passing of air; and an accommodating portion configured to accommodate the toner received through the receiving port, wherein at least a part of the through hole overlaps with the receiving port as viewed in a horizontal direction perpendicular to a direction of gravitation.

According to another aspect of the present invention, there is provided an image forming system comprising: a toner container including a first accommodating portion for accommodating toner and a discharging portion provided with a discharging port for permitting discharge of the toner from the first accommodating portion and configured to discharge the toner together with air through the discharge port by decreasing a volume of the first accommodating portion; a mounting portion to which the toner container is detachably mountable and which includes a receiving port configured to receive toner supplied from the toner container, a passage configured to permit passing of the toner received through the receiving port and provided with a through hole, and a filter portion provided so as to cover the through hole and configured to permit passing of air; and a second accommodating portion configured to accommodate the toner received through the receiving port, wherein at least a part of the through hole overlaps with the receiving port as viewed in a horizontal direction perpendicular to a direction of gravitation.

Further features of the present invention will become apparent from the following description of exemplary embodiments with reference to the attached drawings.

BRIEF DESCRIPTION OF THE DRAWINGS

Part (a) of FIG. 1 is a schematic view showing an image forming apparatus according to a first embodiment, and part (b) of FIG. 1 is a perspective view showing the image forming apparatus.

Figure 5:
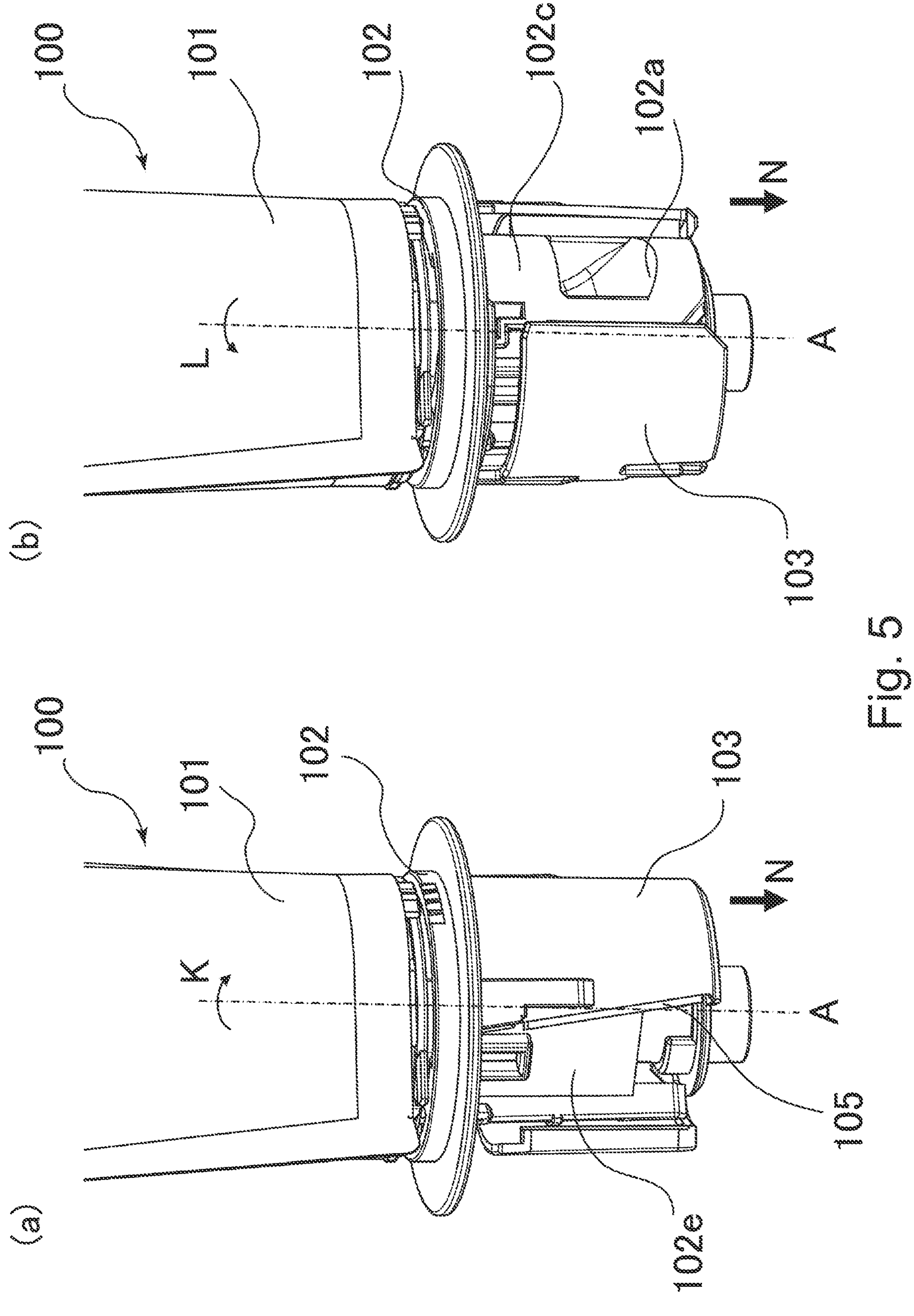

Part (a) of FIG. 5 is a perspective view showing the toner pack when the pack-side shutter is in the shielding position, and part (b) of FIG. 5 is a perspective view showing the toner pack when the pack-side shutter is in an open position.

Figure 6:
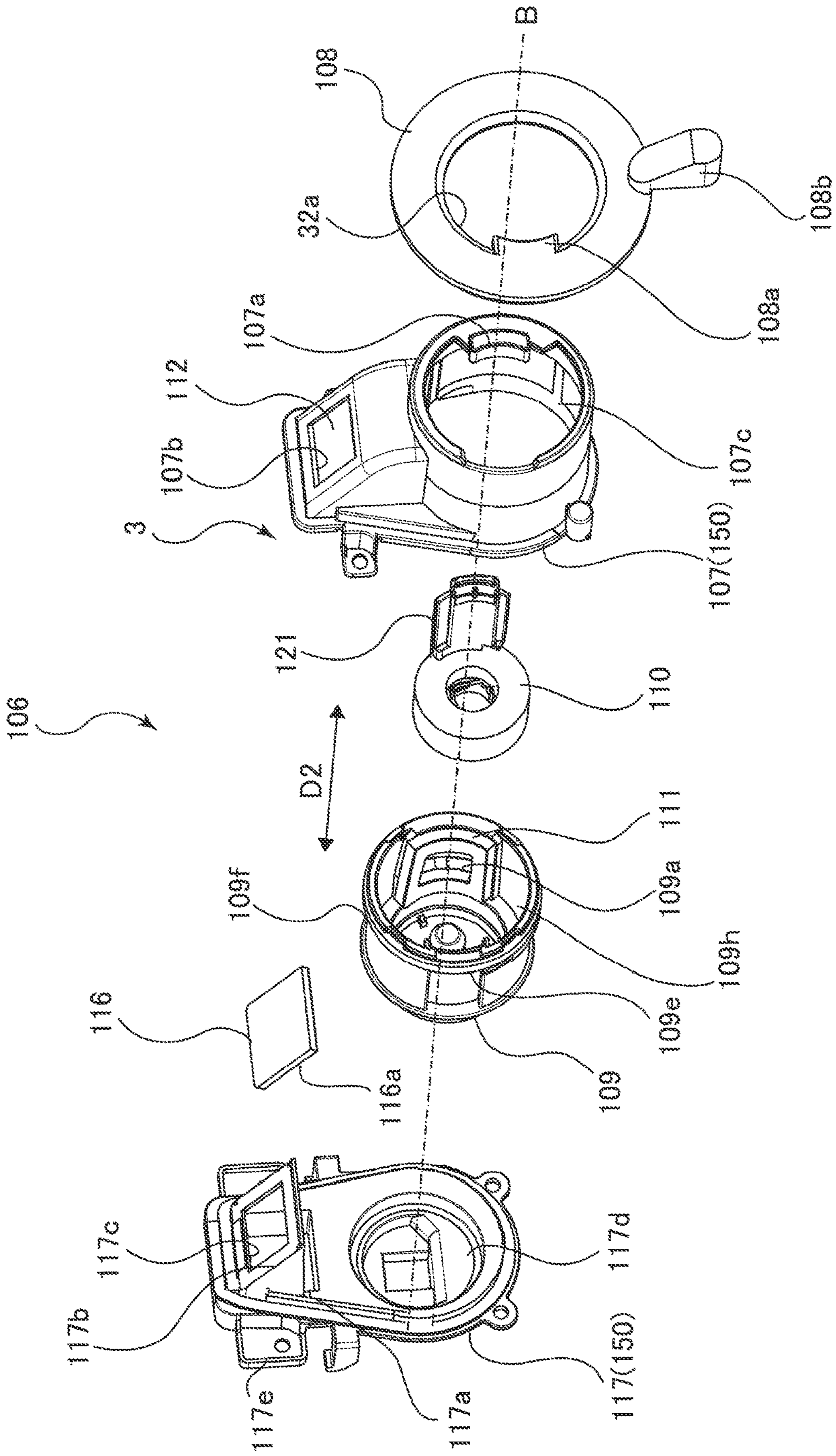

FIG. 6 is an exploded perspective view showing a mounting portion.

Figure 7:
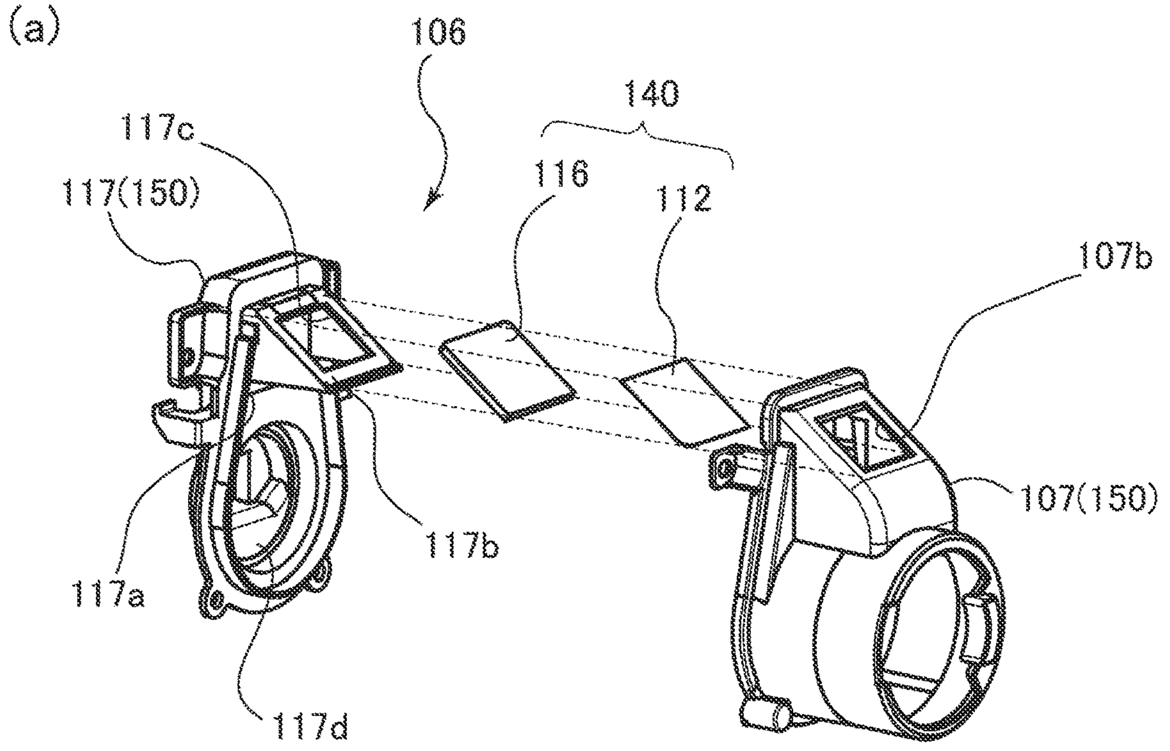
Figure 7:
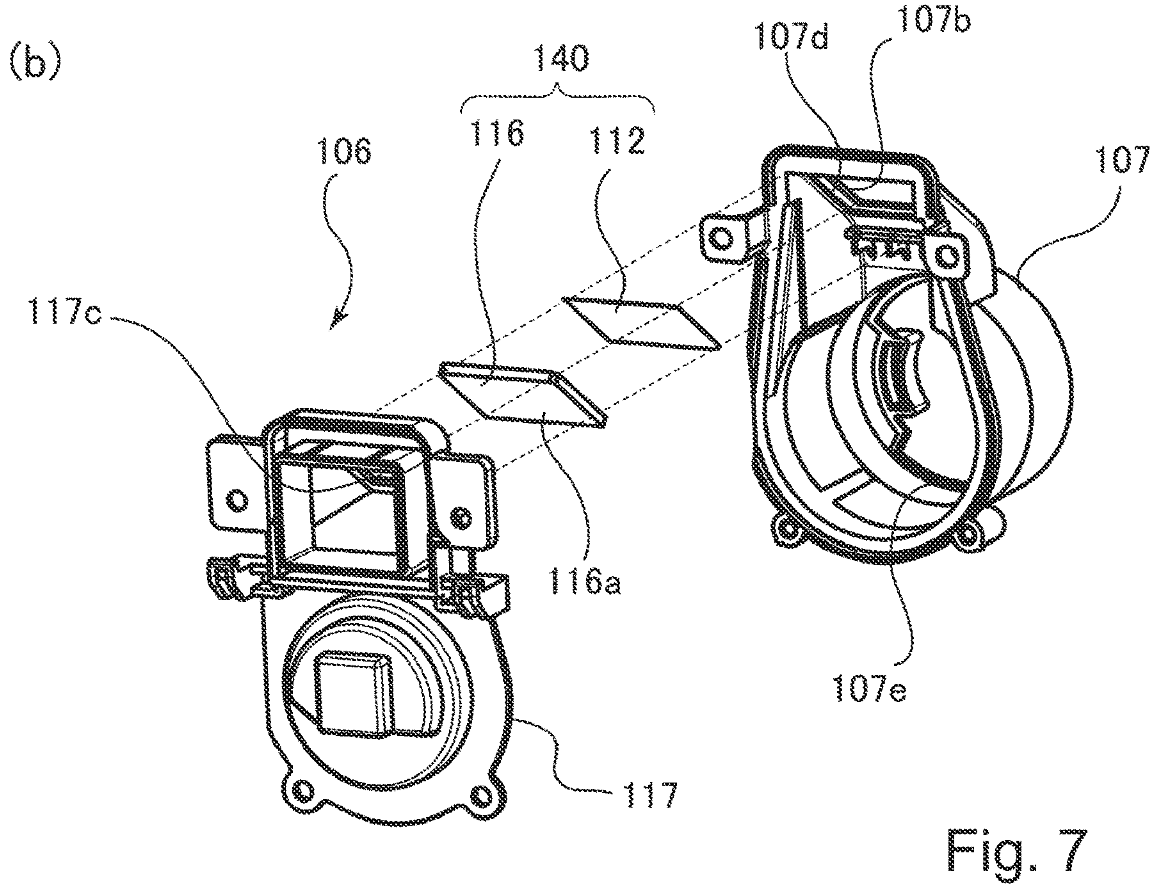

Part (a) of FIG. 7 is an exploded perspective view showing an air-permeable sheet and an air-permeable filter, and part (b) of FIG. 7 is another exploded perspective view showing the air-permeable sheet and the air-permeable filter.

Figure 8:
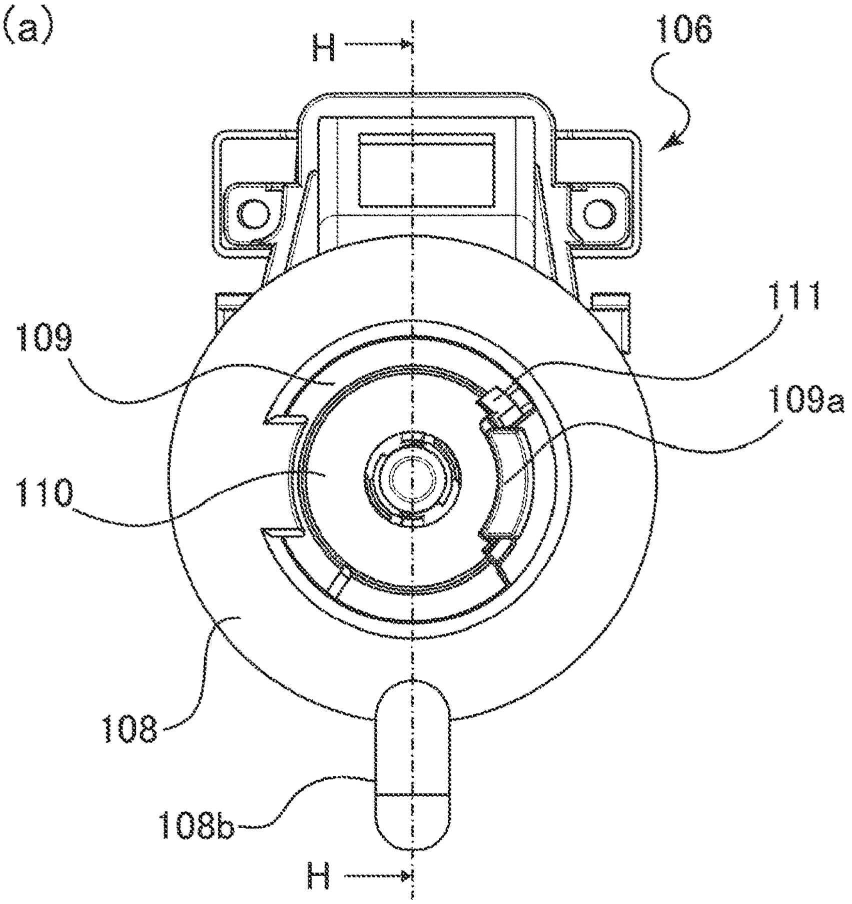
Figure 8:
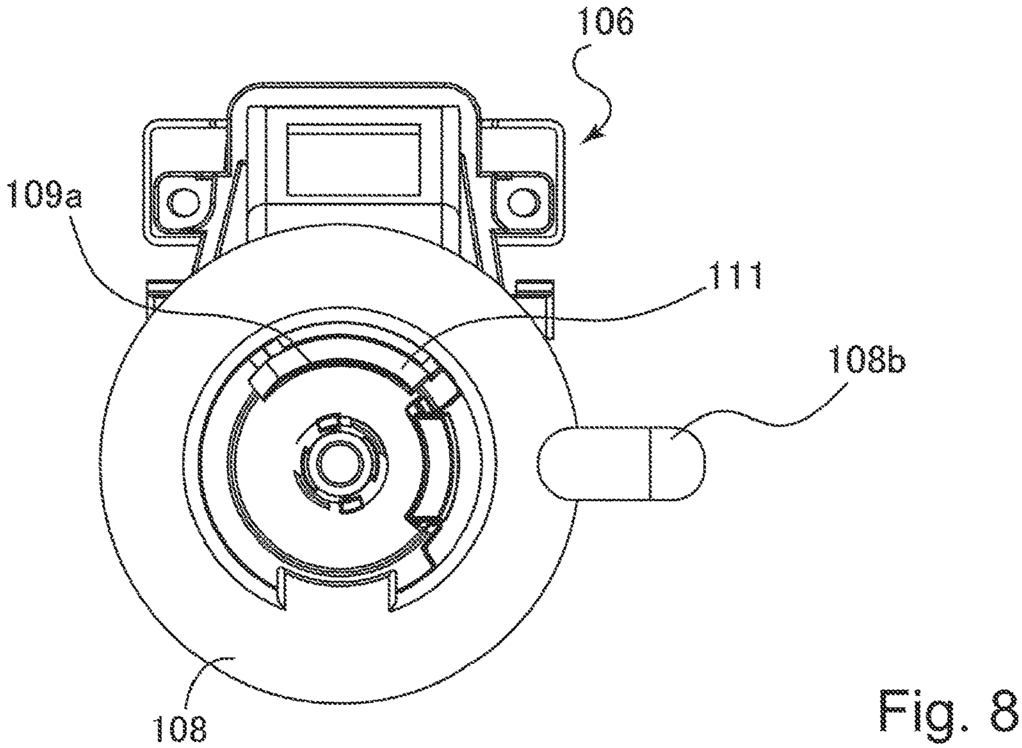

Part (a) of FIG. 8 is a top (plan) view showing the mounting portion including an operating lever positioned in a closed position, and part (b) of FIG. 8 is a top view showing the mounting portion including the operating lever positioned in an open position.

Figure 9:
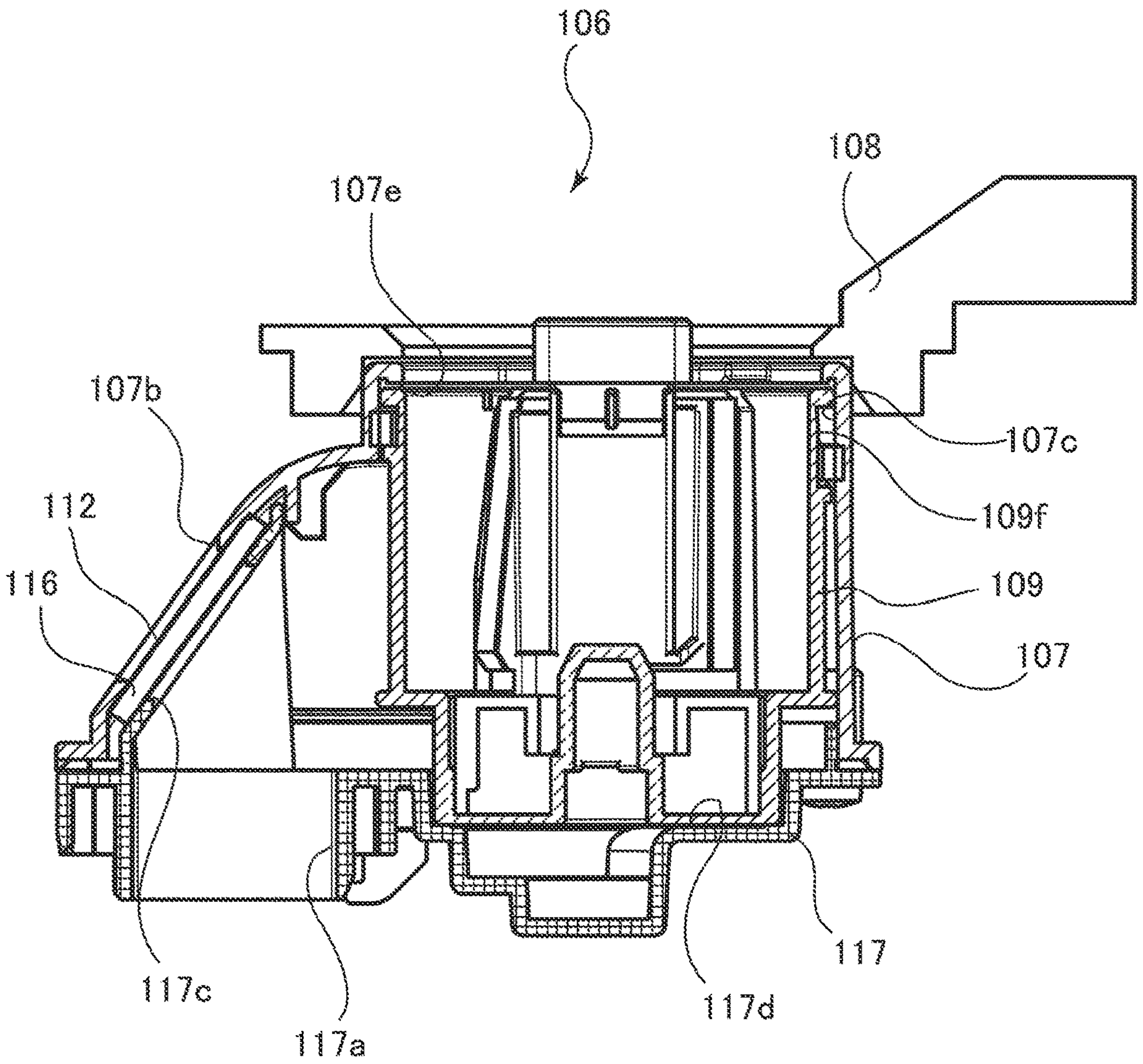

FIG. 9 is a sectional view showing an H-H cross section of part (a) of FIG. 8.

Figure 10:
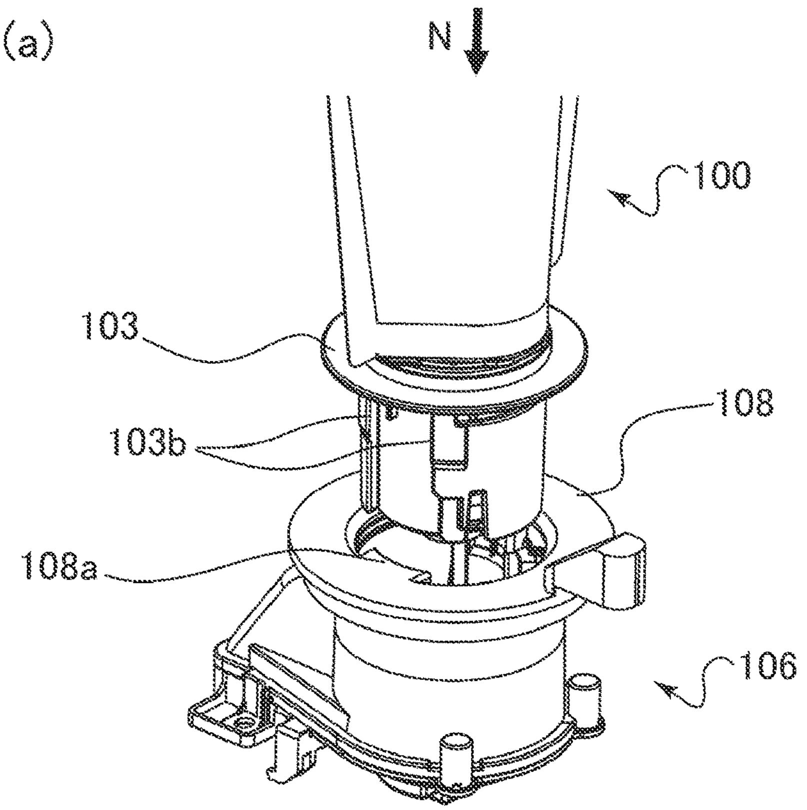
Figure 10:
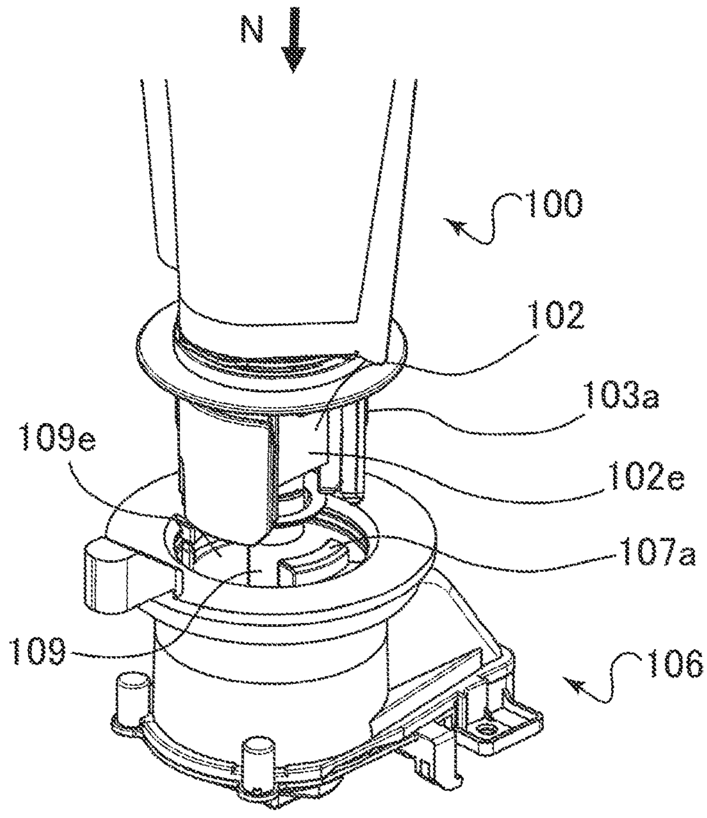

Part (a) of FIG. 10 is a perspective view showing a state in which the toner pack is mounted on the mounting portion, and part (b) of FIG. 10 is another perspective view showing the state in which the toner pack is mounted on the mounting portion.

Figure 11:
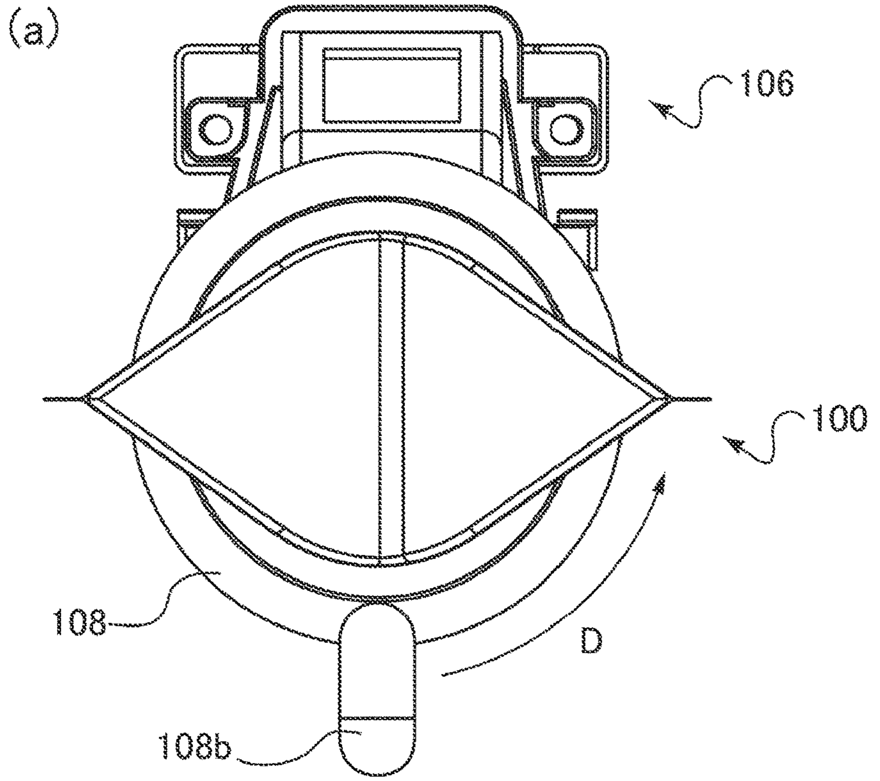
Figure 11:
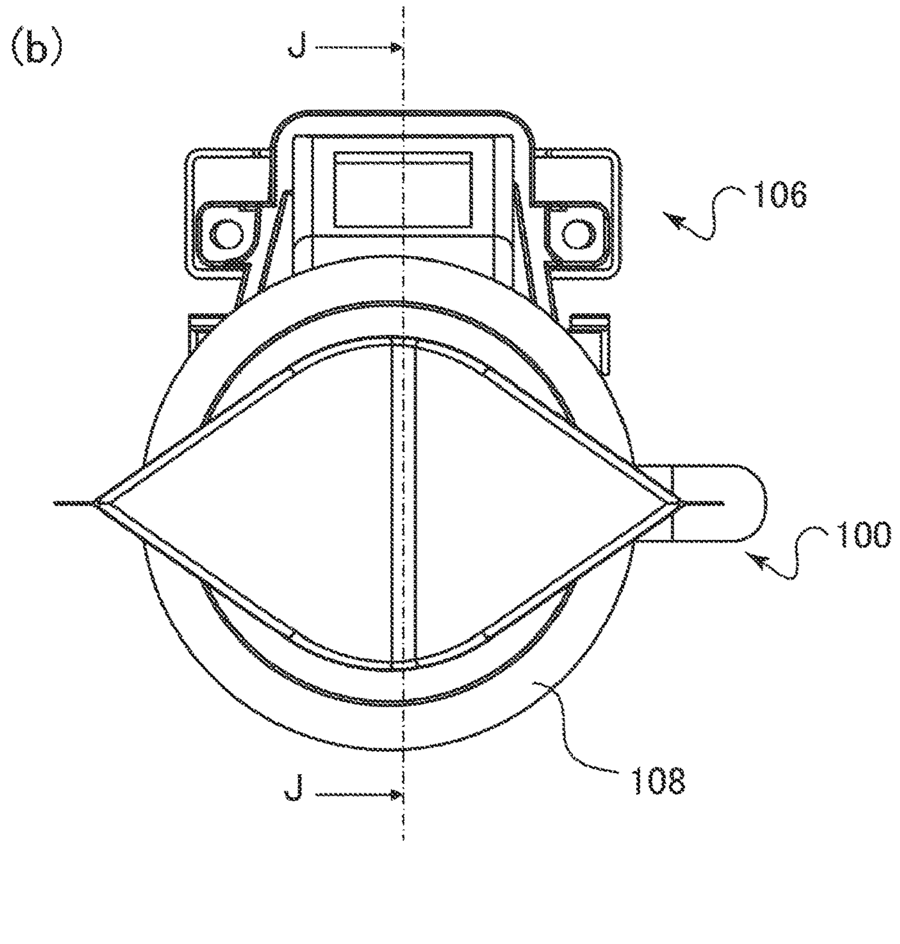

Part (a) of FIG. 11 is a top view showing the toner pack and the mounting portion when the operating lever is positioned in the closed position, and part (b) of FIG. 11 is a top view showing the toner pack and the mounting portion when the operating lever is positioned in the open position.

Figure 12:
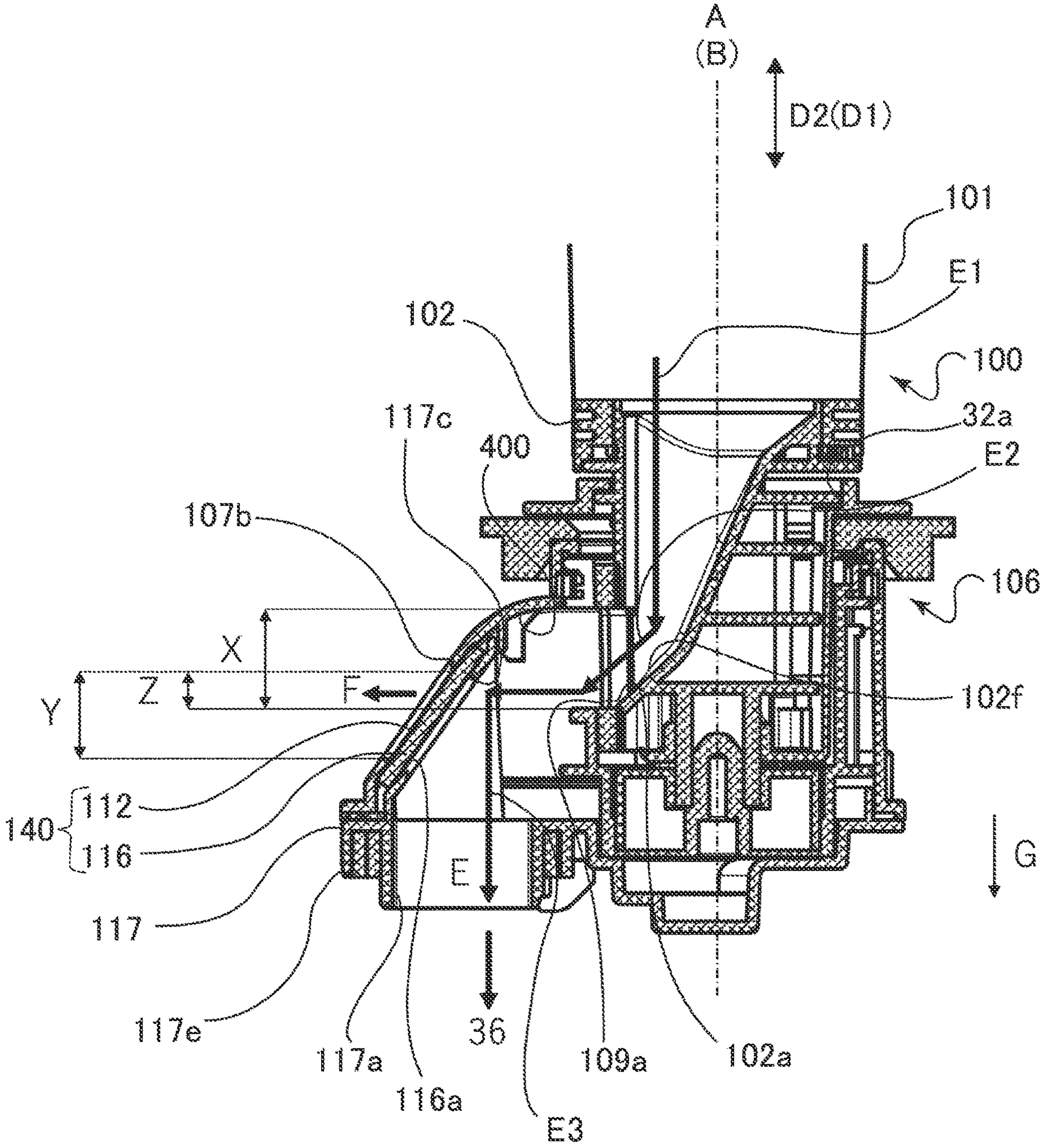

FIG. 12 is a sectional view showing a J-J cross section of part (b) of FIG. 11.

Figure 13:
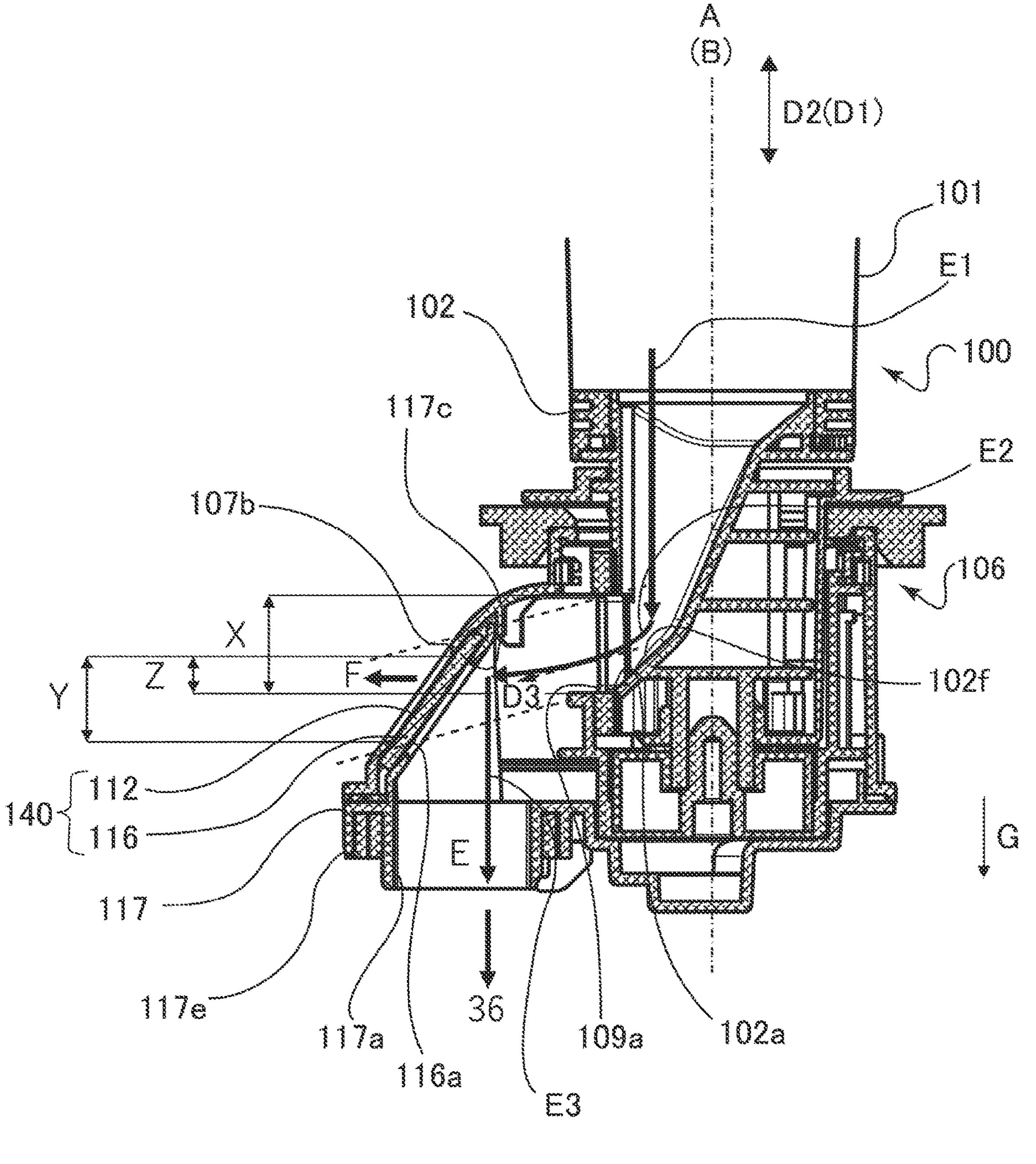

FIG. 13 is a sectional view showing a course E2 of a flow passage E in a form different from a form of FIG. 12.

Figure 14:
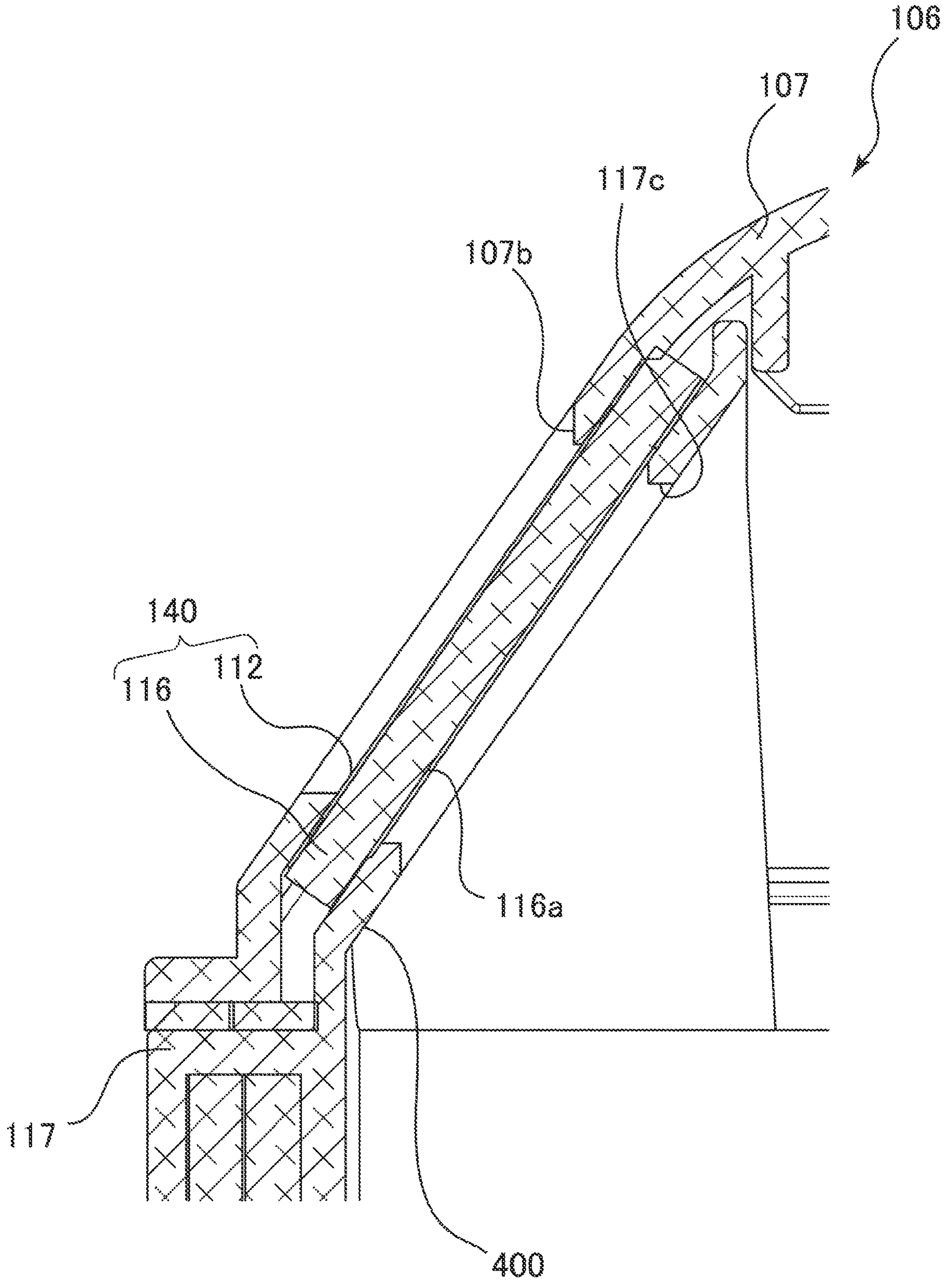

FIG. 14 is an enlarged sectional view showing the air-permeable sheet and the air-permeable filter.

Figure 15:
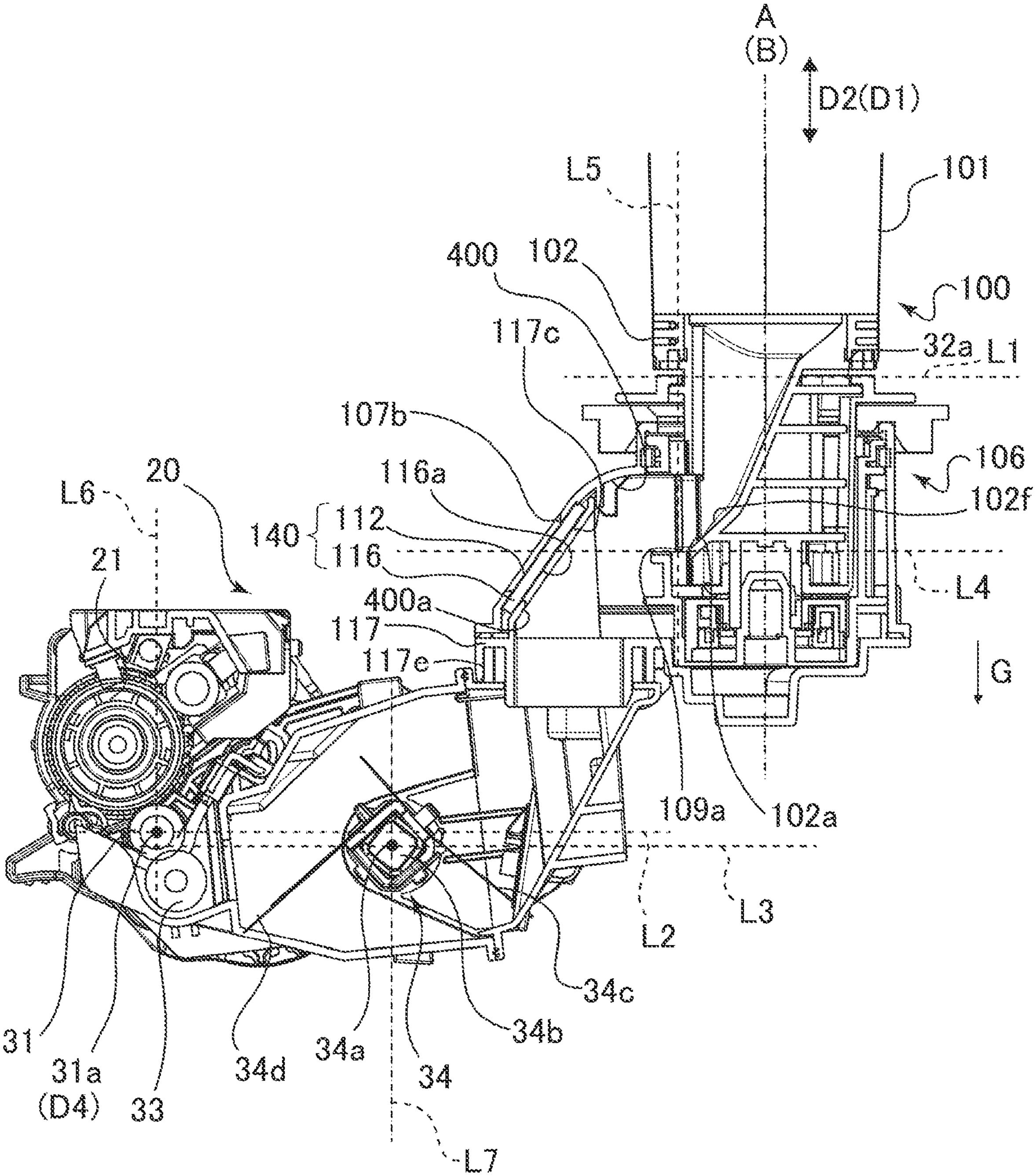

FIG. 15 is a sectional view showing a process unit and the toner pack.

Figure 16:
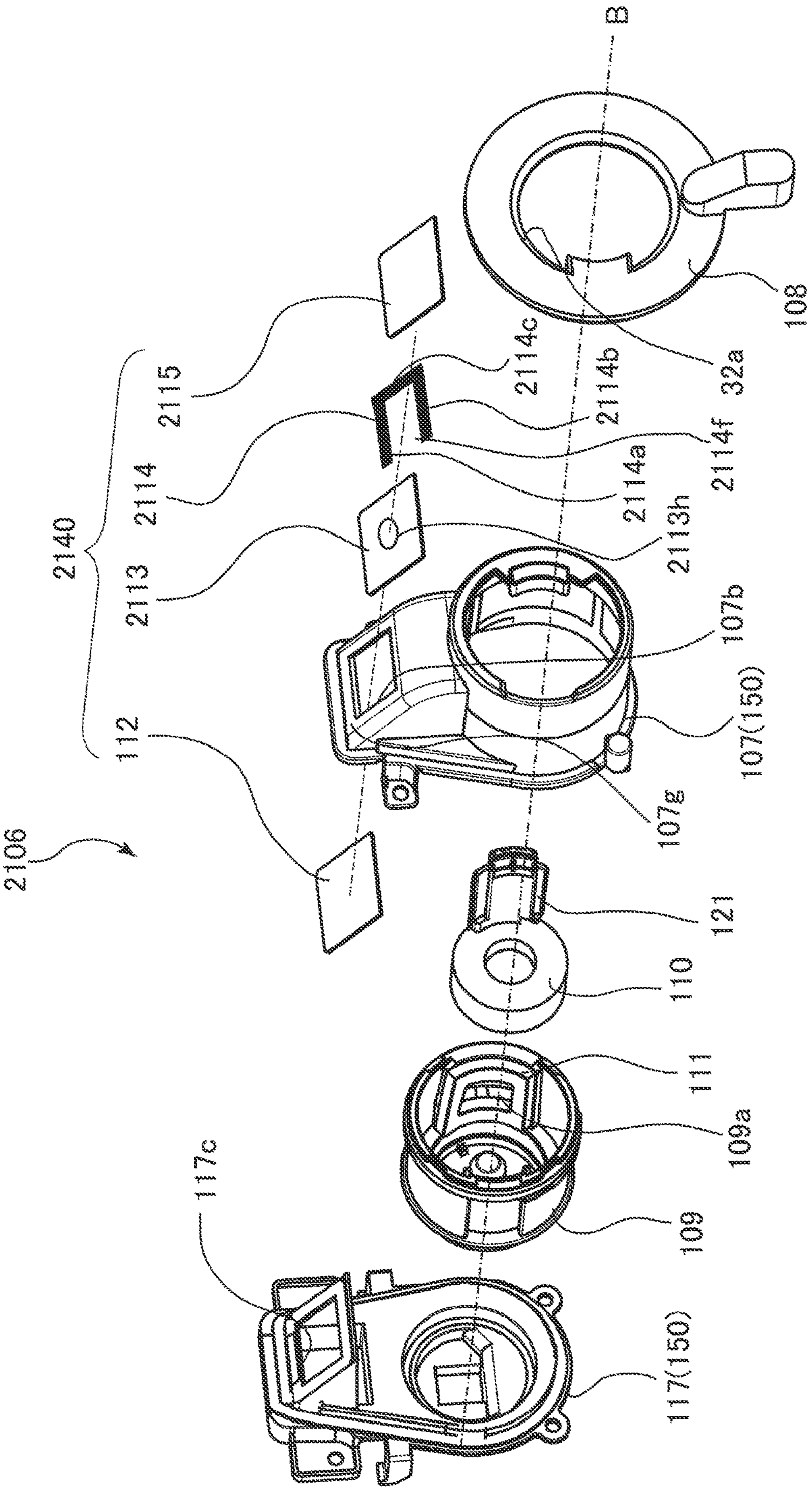

FIG. 16 is an exploded perspective view showing a mounting portion according to a second embodiment.

Figure 17:
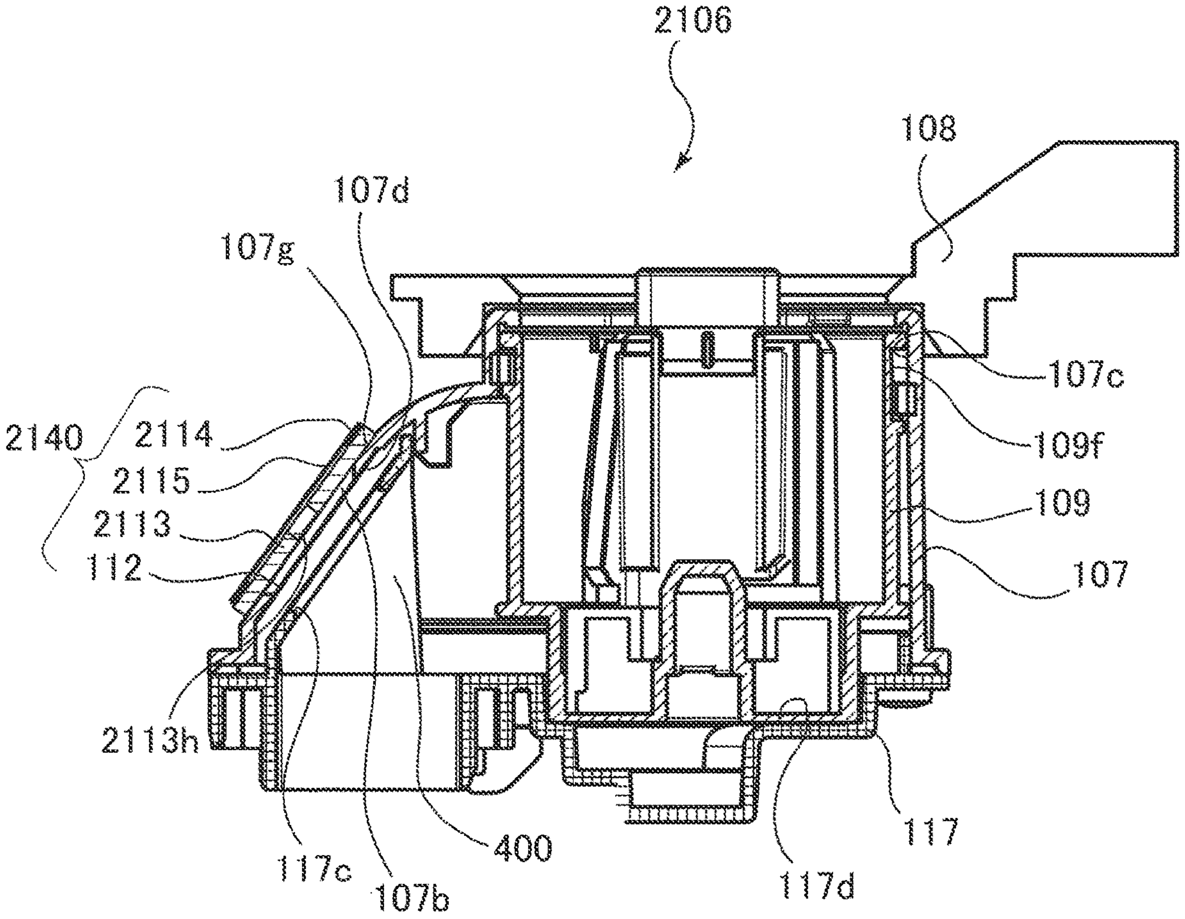

FIG. 17 is a sectional view showing the mounting portion.

Figure 18:
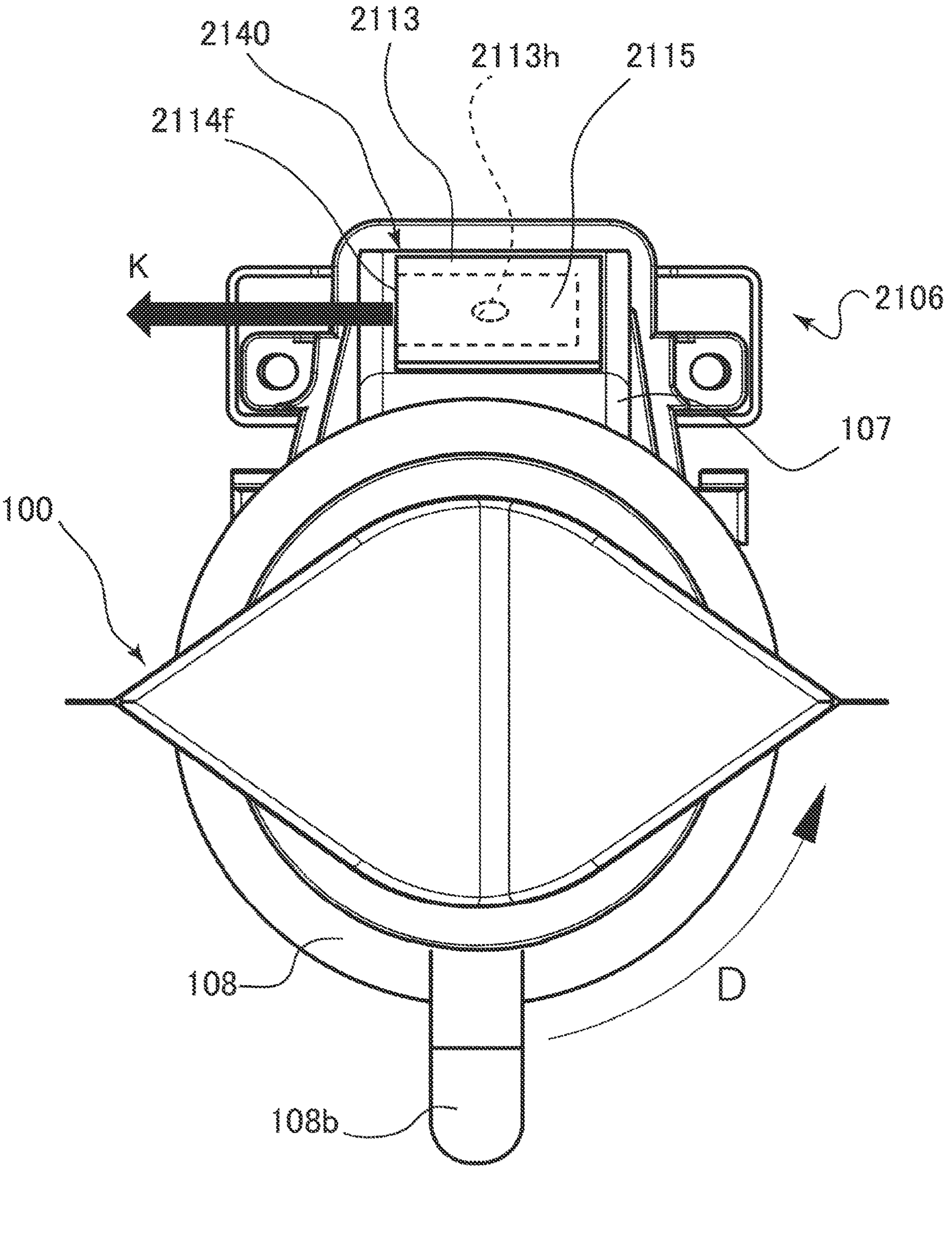

FIG. 18 is a top view showing the mounting portion.

Figure 19:
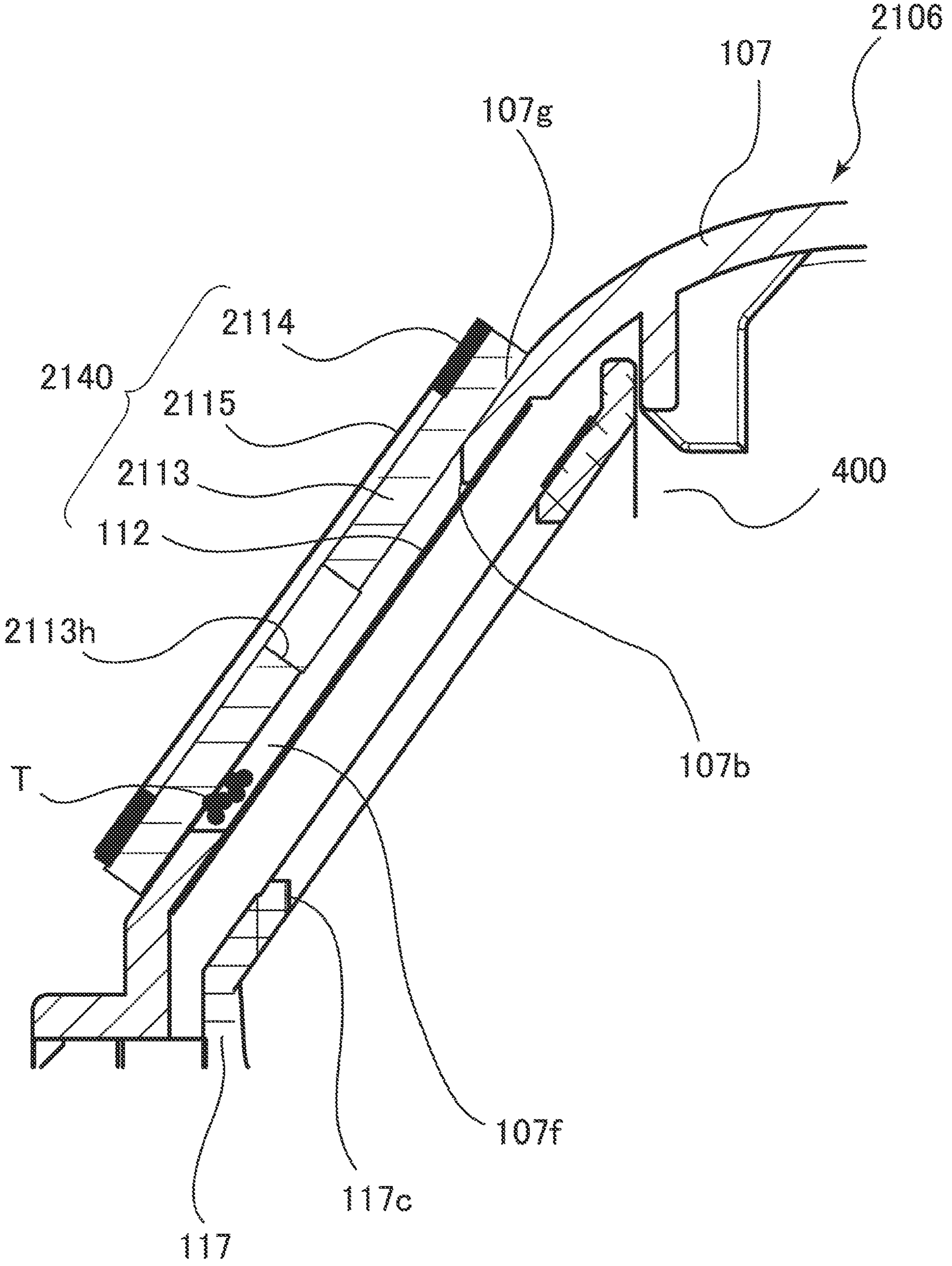

FIG. 19 is a sectional view showing a filter portion.

Figure 20:
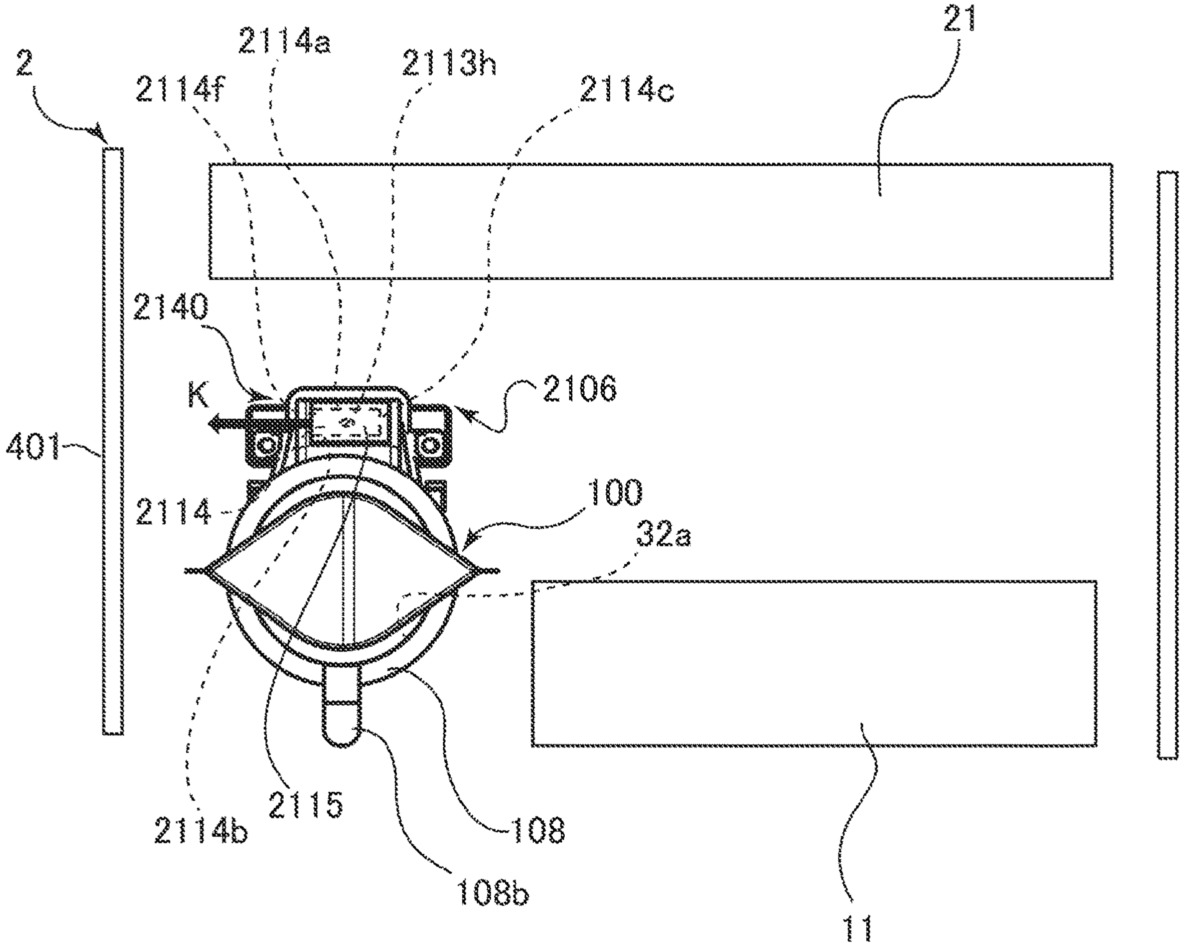

FIG. 20 is a schematic view for illustrating a structure of a periphery of the filter portion.

DESCRIPTION OF THE EMBODIMENTS

First Embodiment

In the following, exemplary embodiments for carrying out the present invention will be described while making reference to the drawings.

Figure 1:
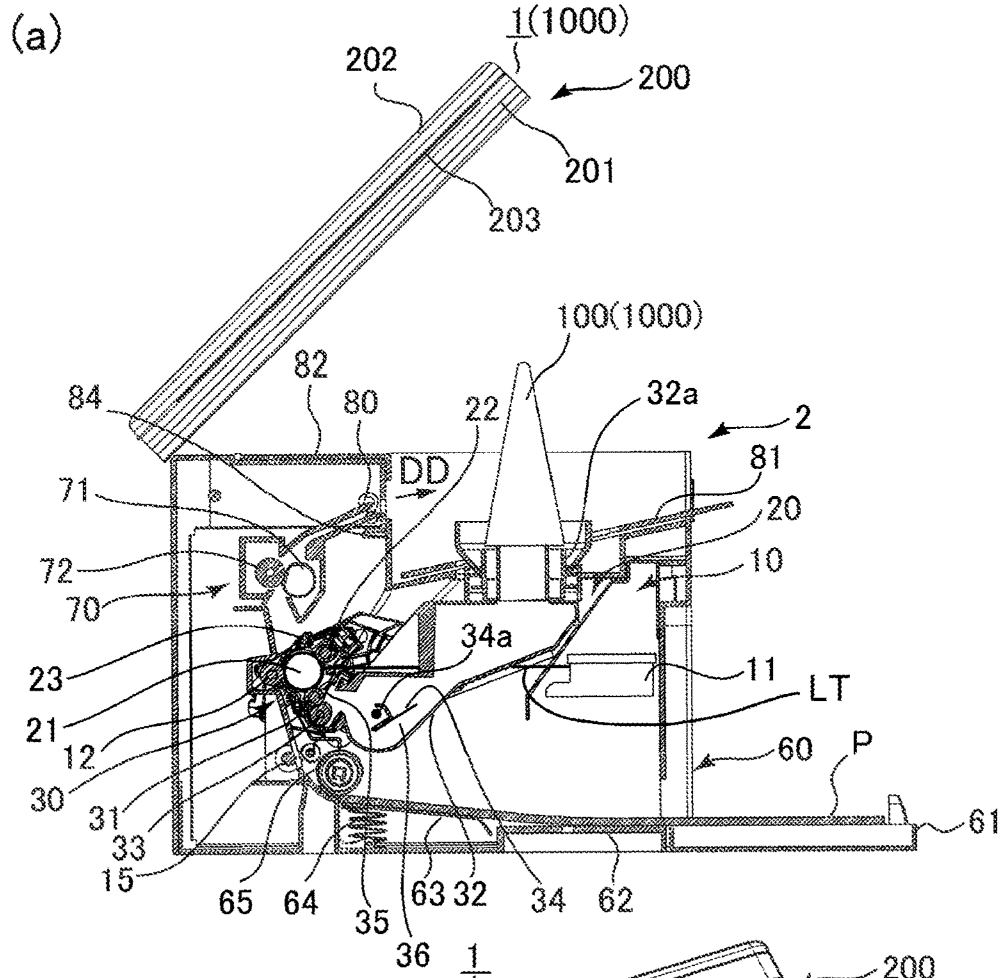
Figure 1:
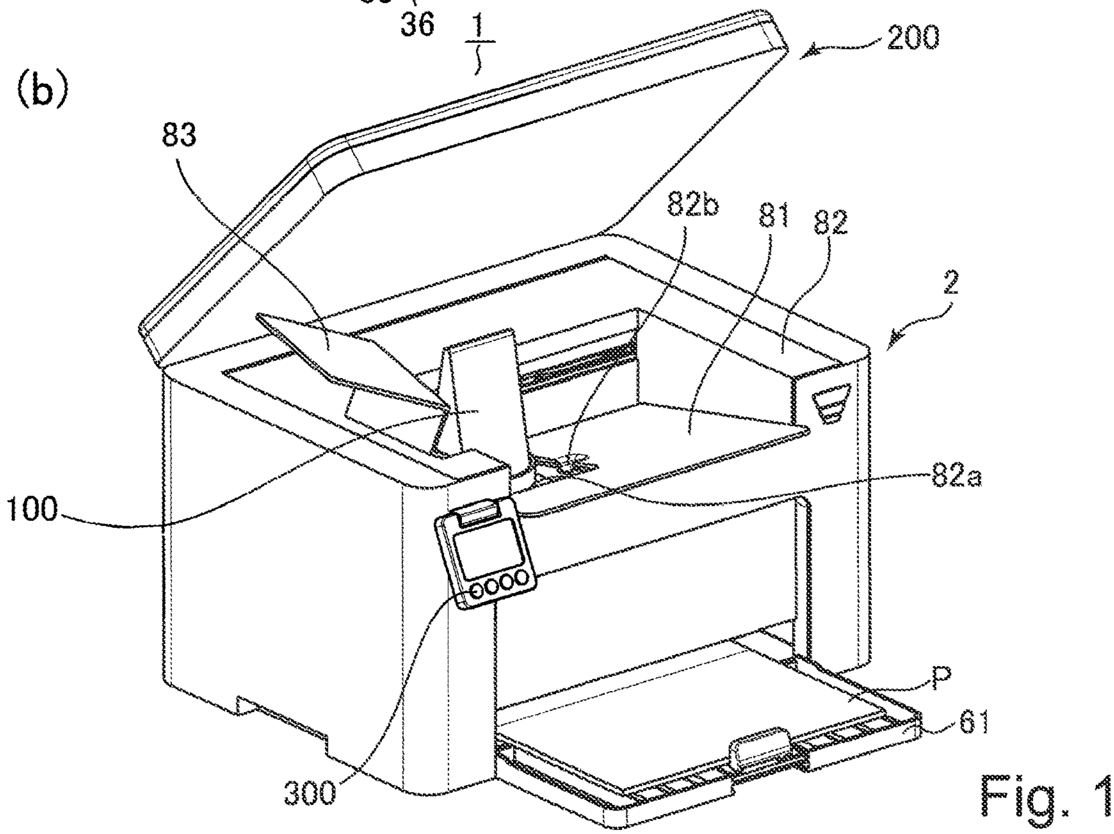
Figure 2:
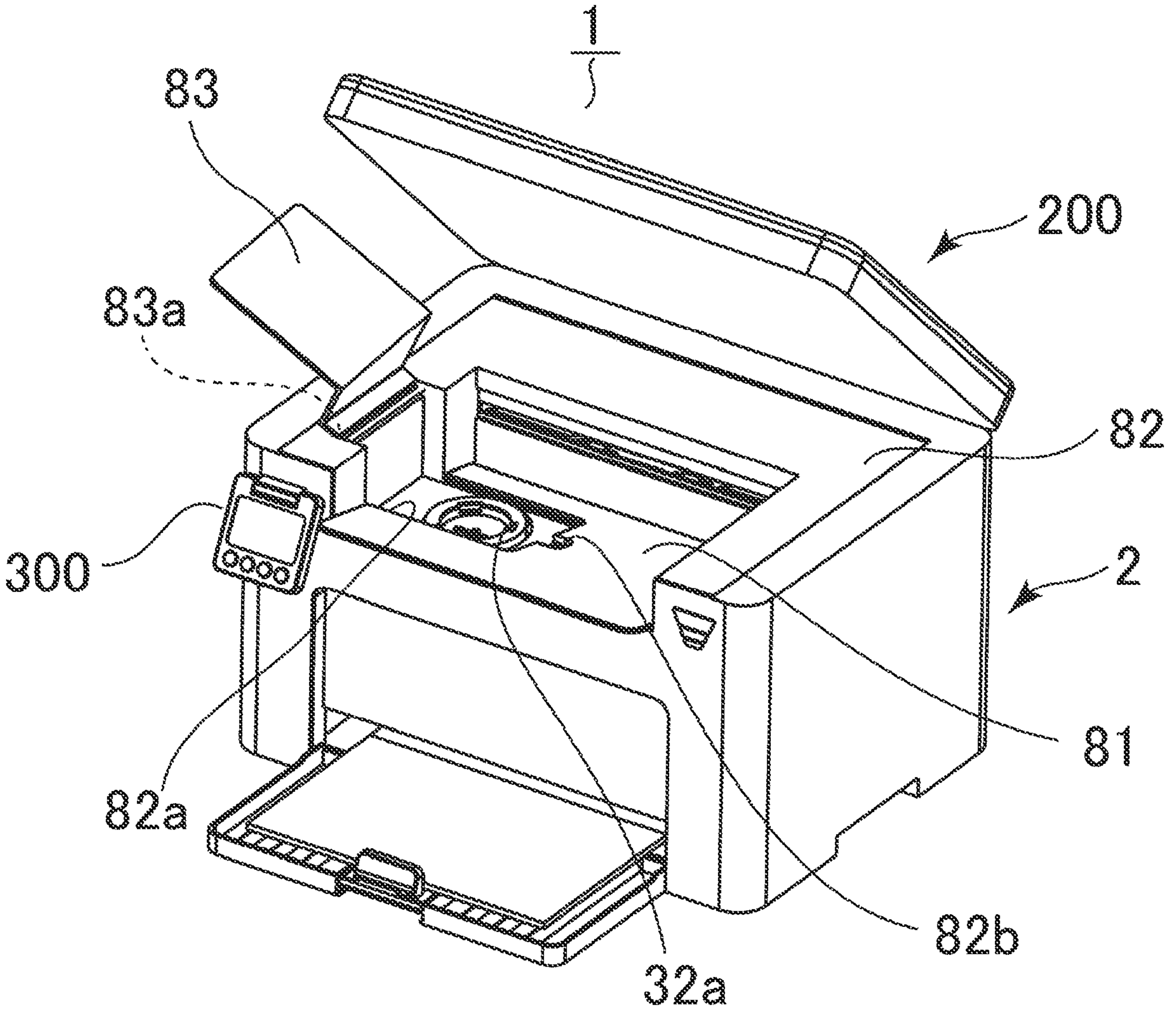
FIG. 2 is a perspective view showing an openable member and a supplying port.

Part (a) of FIG. 1 is a schematic view showing a structure of an image forming apparatus 1 according to a first embodiment. Part (b) of FIG. 1 is a perspective view showing the structure of the image forming apparatus 1. FIG. 2 is a perspective view showing an openable member 83 and a supplying port 32*a*.

The image forming apparatus 1 is a monochromatic printer for forming an image on a recording material P on the basis of image information inputted from an external device. In the recording material P, various sheet materials different in material including papers such as plain paper and thick paper, a plastic film such as a sheet for an overhead projector, special-shaped sheets such as an envelope and index paper, a cloth, and the like are included.

[General Structure]

The image forming apparatus 1 includes, as shown in parts (a) and (b) of FIG. 1, an apparatus main assembly 2, a reading device 200 supported so as to be openable relative to the apparatus main assembly 2, and an operating portion 300 mounted to an outer casing surface of the apparatus main assembly 2. The apparatus main assembly 2 includes an image forming portion 10 for forming a toner image on the recording material, a feeding portion 60 for feeding the recording material to the image forming portion 10, a fixing portion 70 for fixing the toner image, formed by the image forming portion 10, on the recording material, and a discharging roller pair 80.

The image forming portion 10 includes a scanner unit 11, a process unit 20 of an electrophotographic type, and a transfer roller 12 for transferring the toner image, formed on a photosensitive drum 21 of the process unit 20, onto the recording material. The process unit 20 includes the photosensitive drum 21, a charging roller 22 disposed at a periphery of the photosensitive drum 21, a pre-exposure device 23, and a developing device 30 including a developing roller 31.

The photosensitive drum 21 is a photosensitive member molded in a cylindrical shape. The photosensitive drum 21 in this embodiment includes, on a drum-shaped base material molded with aluminum, a photosensitive layer formed with a negatively chargeable organic photosensitive member. Further, the photosensitive drum 21 as an image bearing member is rotationally driven at a predetermined process speed in a predetermined direction (clockwise direction in the figure) by a motor.

The charging roller 22 contacts the photosensitive drum 21 at a predetermined press-contact force and forms a charging portion. Further, a desired charging voltage is applied to the charging roller 22 by a high charging voltage power source, so that the charging roller 22 electrically charges a surface of the photosensitive drum 21 uniformly to a predetermined potential. In this embodiment, the photosensitive drum 21 is charged to a negative polarity by the charging roller 22. The pre-exposure device 23 discharges (removes) a surface potential of the photosensitive drum 21, at a position in front of the charging portion in order to generate stable electric discharge at the charging portion.

The scanner unit 11 irradiates the photosensitive drum 21, by using a polygonal mirror, with laser light LT corresponding to image information inputted from the external device or the reading device 200, so that the surface of the photosensitive drum 21 is subjected to scanning exposure. By this light exposure, an electrostatic latent image depending on the image information is formed on the surface of the photosensitive drum 21. Incidentally, the scanner unit 11 is not limited to a laser scanner device, but for example, an LED exposure device including an LED array in which a plurality of LEDs are arranged along a longitudinal direction of the photosensitive drum 21 may be employed.

The developing device 30 includes the developing roller 31 as a developer carrying member for carrying a developer, a developing container 32 which is a casing for the developing device 30, and a supplying roller 33 capable of supplying the developer to the developing roller 31. The developing roller 31 and the supplying roller 33 are rotatably supported by the developing container 32. Further, the developing roller 31 is constituted so as to rotate about a roller axis 31*a* (see FIG. 15) as a first rotational axis and is disposed at an opening of the developing container 32 so as to oppose the photosensitive drum 21. The supplying roller 33 rotatably contacts the developing roller 31, and toner as the developer accommodated in the developing container 32 is applied onto the surface of the developing roller 31 by the supplying roller 33. Incidentally, when a constitution capable of supplying the toner sufficiently to the developing roller 31 is employed, the supplying roller 33 is not necessarily required.

The developing device 30 in this embodiment uses a contact development type as a development type. That is, a toner layer carried on the developing roller 31 contacts the photosensitive drum 21 at a developing portion (developing region) where the photosensitive drum 21 and the developing roller 31 oppose each other. To the developing roller 31, a developing voltage is applied by a high developing voltage power source. Under application of the developing voltage, the toner carried on the developing roller 31 is transferred from the developing roller 31 onto the drum surface in accordance with a potential distribution of the surface of the photosensitive drum 21, so that the electrostatic latent image is developed into a toner image. Incidentally, in this embodiment, a reversal development type is employed. That is, the toner image is formed by being deposited on a surface region of the photosensitive drum 21 attenuated in charge amount by being exposed to light in an exposure step after being charged in a charging step.

Further, in this embodiment, the toner which is 6 μm in particle size and of which normal charge polarity is a negative polarity is used. As the toner in this embodiment, a polymerization toner formed by a polymerization method as an example is employed. Further, the toner in this embodiment is a so-called non-magnetic one-component developer which does not contain a magnetic component and in which the toner is carried on the developing roller 31 principally by an intermolecular force or an electrostatic force (mirror force). However, a one-component developer containing a magnetic component may also be used. Further, in the one-component developer, an additive (for example, wax or silica fine particles) for adjusting flowability and charging performance of the toner is contained in addition to toner particles in some cases. Further, as the developer, a two-component developer constituted by non-magnetic toner and a magnetic carrier may also be used. In the case where the developer having a magnetic property is used, as the developer carrying member, for example, a cylindrical developing sleeve inside of which a magnet is disposed is used.

The developing container 32 is provided with an accommodating portion 36 as a second accommodating portion and a stirring member 34 provided inside the accommodating portion 36. The stirring member 34 includes a shaft member **34*b* rotatable about a rotational axis 34*a* as a second rotational axis by being driven by an unshown motor, and sheet members 34*c* and 34*d* each fixed to the shaft member 34*b*. The stirring member 34 as a feeding member not only stirs the toner in the developing container 32 but also sends the toner toward the developing roller 31 and the supplying roller 33 by being rotated. Further, the stirring member 34 has a function of circulating the toner, peeled off from the developing roller 31 without being used for the development, in the developing container 32 and of uniformizing the toner in the developing container 32. Incidentally, the stirring member 34 is not limited to a rotatable form. For example, a stirring member in a swingable form may also be employed. Further, as regards the sheet members 34*c* and 34*d***, either one thereof may be used, and three or more sheet members may be provided.

Further, at an opening of the developing container 32 where the developing roller 31 is disposed, a developing blade 35 for regulating an amount of the toner carried on the developing roller 31 is disposed. The toner supplied to the surface of the developing roller 31 passes through an opposing portion to the developing blade 35 with rotation of the developing roller 31, so that the toner is uniformly formed in a thin layer and is charged to the negative polarity by triboelectric charge.

A feeding portion 60 includes, as shown in parts (a) and (b) of FIG. 1, a front door 61 supported so as to be openable by the apparatus main assembly 2, a tray portion 62, an intermediary plate 63, a tray spring 64, and a pick-up roller 65. The tray portion 62 constitutes a bottom of a recording material accommodating space which appears by opening the front door 61, and the intermediary plate 63 is supported by the tray portion 62 so as to be capable of being raised and lowered. The tray spring 64 urges the intermediary plate 63 upward and presses the recording materials P, stacked on the intermediary plate 63, against the pick-up roller 65. Incidentally, the front door 61 closes the recording material accommodating space in a state in which the front door 61 is closed relative to the apparatus main assembly 2, and supports the recording materials P together with the tray portion 62 and the intermediary plate 63 in a state in which the front door 61 is opened relative to the apparatus main assembly 2.

The fixing portion 70 is of a heat fixing type in which an image fixing process is performed by heating and melting the toner on the recording material. The fixing portion 70 includes a fixing film 71, a fixing heater such as a ceramic heater for heating the fixing film 71, a thermistor for measuring a temperature of the fixing heater, and a pressing roller 72 press-contacting the fixing film 71.

Next, an image forming operation of the image forming apparatus 1 will be described. When an instruction of image formation is inputted to the image forming apparatus 1, on the basis of the image information inputted from an external computer connected to the image forming apparatus 1 or from the reading device 200, an image forming process by the image forming portion 10 is started. The scanner unit 11 emits the laser light toward the photosensitive drum 21 on the basis of the inputted image information. At this time, the photosensitive drum 21 is charged in advance by the charging roller 22, and is irradiated with the laser light, so that the electrostatic latent image is formed on the photosensitive drum 21. Thereafter, this electrostatic latent image is developed by the developing roller 31, so that the toner image is formed on the photosensitive drum 21.

In parallel to the above-described image forming process, the pick-up roller 65 of the feeding portion 60 sends the recording material P supported by the front door 61, the tray portion 62, and the intermediary plate 63. The recording material P is fed to a registration roller pair 15 by the pick-up roller 65, and is abutted against a nip of the registration roller pair 15, so that oblique movement of the recording material P is corrected. Then, the registration roller pair 15 is driven by being timed to a transfer timing of the toner image, and is conveyed toward a transfer nip formed by a transfer roller 12 and the photosensitive drum 21.

To the transfer roller 12, a transfer voltage power is applied from a high transfer voltage source, so that the toner image carried on the photosensitive drum 21 is transferred onto the recording material P conveyed by the registration roller pair 15. The recording material P onto which the toner image is transferred is conveyed to the fixing portion 70, where the toner image is heated and pressed when the recording material P passes through a nip between the fixing film 71 and the pressing roller 72 of the fixing portion 70. By this, toner particles are melted and are thereafter fixed, so that the toner image is fixed on the recording material P. The recording material P passed through the fixing portion 70 is discharged to an outside of the image forming apparatus 1 (outside of the printer) by a discharging roller pair 80, so that the discharged recording materials P are stacked on a discharge tray 81 formed at an upper portion of the apparatus main assembly 2. The discharging roller pair 80 as discharging rollers discharges the recording material P onto the discharge tray 81 in a discharging direction DD.

The discharge tray 81 is inclined upward toward a downstream in a discharging direction of the recording material P, and the recording material P discharged on the discharge tray 81 slides down on the discharge tray 81, so that a trailing end of the recording material is aligned by a restricting surface 84.

The reading device 200 includes a reading unit 201 in which an unshown reading portion is built, and a platen (pressure plate) 202 supported by the reading unit 201 so as to be openable (closable). At an upper surface of the reading unit 201, an original supporting platen glass 203, which permits transmission of light emitted from the reading portion and on which an original is to be placed, is provided.

In the case where a user intends to cause the reading device 200 to read an image of the original, the user places the original on the original supporting platen glass 203 in a state in which the platen 202 is opened. Then, the platen 202 is closed and a positional deviation of the original on the original supporting platen glass 203 is prevented, so that a reading instruction is outputted to the image forming apparatus 1 by operating the operating portion 300, for example. When a reading operation is started, the reading portion in the reading unit 201 reciprocates in a sub-scan direction, i.e., a left-right direction in a state in which the user faces the operating portion 300 of the image forming apparatus 1 on a front (surface) side. The reading portion receives light reflected by the original by a light receiving portion while emitting light from a light emitting portion toward the original, and photoelectrically converts the light, so that the reading portion reads the image of the original. Incidentally, in the following, on the basis of a state in which the user faces the operating portion 300 on the front side, a front-rear direction, the left-right direction, and an up-down direction are defined.

At an upper portion of the apparatus main assembly 2, a top cover 82 is provided, and at an upper surface of the top cover 82, the discharge tray 81 is formed. As shown in part (b) of FIG. 1 and FIG. 2, the openable member 83 is supported by the top cover 82 so as to be openable (closable) about a rotation shaft 83*a* extending in the front-rear direction. On the discharge tray 81 of the top cover 82, an opening 82*a* which opens upward is formed.

The openable member 83 is constituted so as to be movable between a closed position where the openable member 83 covers a supplying port 32*a* so that a toner pack 100 cannot be mounted on the developing container 32 and an openable position where the supplying port 32*a* is exposed so that the toner pack 100 can be mounted on the developing container 32. The openable member 83 functions as a part of the discharge tray 81 in the closed position. The openable member 83 and the opening 82*a* are formed on a left(-hand) side of the discharge tray 81. Further, the openable member 83 is opened in a left(-hand) direction by being hooked with user's finger(s) from a groove portion 82*b* provided on the top cover 82. The openable member 83 is formed in a substantially L-shape along a shape of the top cover 82.

The opening 82*a* of the discharge tray 81 opens so that the supplying port 32*a* for toner supply formed at the upper portion of the developing container 32 is exposed, and the openable member 83 is opened, so that the user can be provided access to the supplying port 32*a*. Incidentally, in this embodiment, a type (direct supply type) in which the user supplies the toner from the toner pack 100 (see, parts (a) and (b) of FIG. 1), filled with the toner for supply, to the developing device 30 kept in a state in which the developing device 30 is mounted in the image forming apparatus 1 is employed. The toner pack 100 is exposed to the outside at least at a part thereof in a state in which the toner pack 100 is mounted on the mounting portion 106 (see, FIG. 6).

For this reason, in the case where a remaining toner amount of the process unit 20 becomes small, an operation in which the process unit 20 is taken out of the apparatus main assembly 2 and is exchanged with a new process unit becomes unnecessary, so that usability can be improved. Further, the toner can be supplied to the developing container 32 more inexpensively than exchange of entirety of the process unit 20. Incidentally, the direct supply type can be reduced in cost since there is no need to exchange various rollers and gears, and the like even when compared with the case where only the developing device 30 of the process unit 20 is exchanged. Incidentally, the image forming apparatus 1 and the toner pack 100 constitute an image forming system 1000.

[Structure of Toner Pack]

Figure 3:
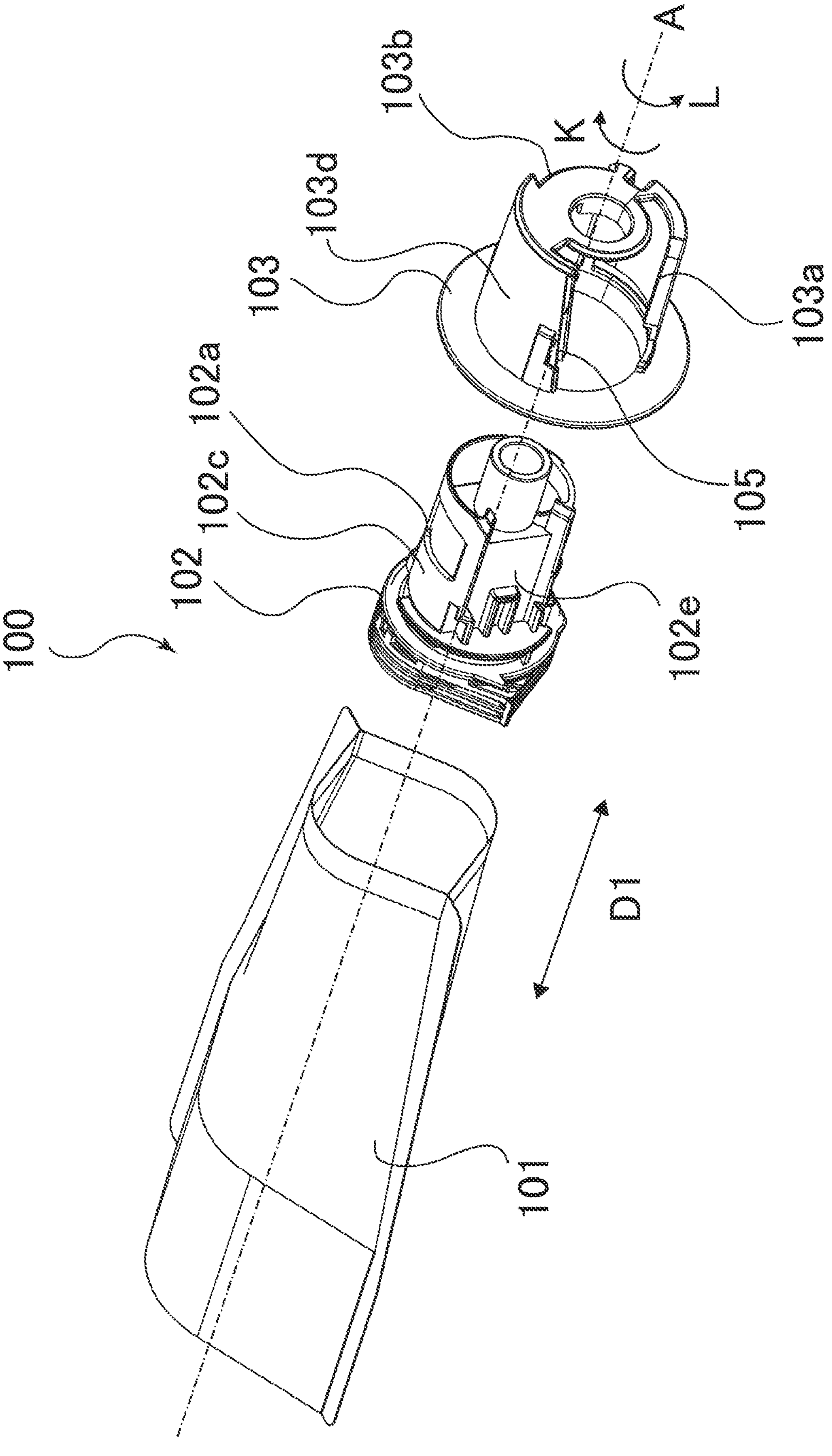
FIG. 3 is an exploded perspective view showing a toner pack when a pack-side shutter is in a shielding position.
Figure 4:
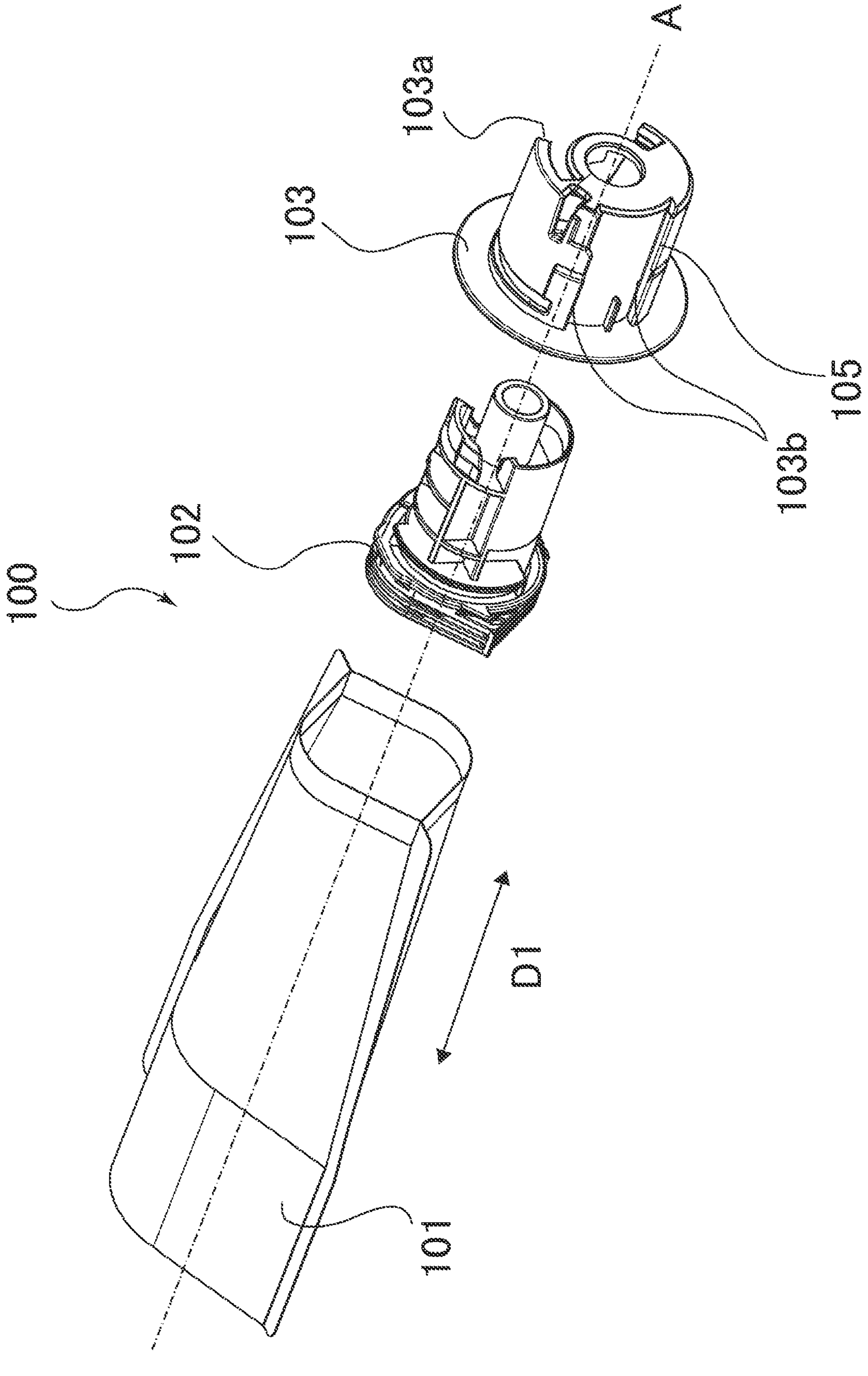
FIG. 4 is another exploded perspective view showing the toner pack when the pack-side shutter is in the shielding position.

A basic structure of the toner pack 100 which is detachably mountable to the image forming apparatus 1 and in which the toner is accommodated will be described using FIG. 3 to part (b) of FIG. 5. The toner pack 100 as a toner container is mounted on the mounting portion 106 (described later). FIG. 3 is an exploded perspective view showing the toner pack 100 when a pack-side shutter 103 is in a shielding position. FIG. 4 is another exploded perspective view showing the toner pack 100 when the pack-side shutter 103 is in the shielding position. Part (a) of FIG. 5 is a perspective view of the toner pack 100 when the pack-side shutter 103 is in the shielding position. Part (b) of FIG. 5 is a perspective view of the toner pack 100 when the pack-side shutter 103 is in an open position.

The toner pack 100 includes, as shown in FIG. 3 to part (b) of FIG. 5, a pouch 101 for accommodating the toner, a nozzle 102 connected to the pouch 101, and the pack-side shutter 103. The pouch 101 as a first accommodating portion has flexibility, and is provided on one end side of the toner pack 100 with respect to an axial direction D1 along a rotational axis A which is a rotational axis of the pack-side shutter 103. The nozzle 102 and the pack-side shutter 103 are provided on the other end side of the toner pack 100 with respect to the axial direction D1. The pouch 101 is formed by subjecting, for example, a polypropylene sheet to pouch processing, and has a bag shape such that one end portion thereof opens. Incidentally, the pouch 101 may also be a bottle made of a resin material or a container made of paper or a vinyl resin material.

The nozzle 102 as a discharging portion is connected to the pouch 101, but a connecting method may be any method. For example, as the connecting method, a method using various adhesives such as a hot-melt adhesive, a method in which the pouch 101 is thermally welded to an outer periphery of the nozzle 102, and the like method may be used.

A side surface 102*c* of the nozzle 102 extending in the axial direction D1 is provided with a discharging port 102*a* constituted so as to communicate with an inside of the pouch 101 and provided with a recessed portion 102*e*. The recessed portion 102*e* is provided in a position different from the discharging port 102*a* with respect to a rotational direction of the pack-side shutter 103. The toner accommodated in the pouch 101 is constituted so as to be discharged together with the air to an outside of the toner pack 100 through discharging port 102*a* by being compressed (squeezed) by the user and thus by being decreased in volume of the pouch 101. Incidentally, the nozzle 102 may also be constituted by a plurality of members, not a single member.

Outside the side surface 102*c* of the nozzle 102, the pack-side shutter 103 is disposed. The pack-side shutter 103 is provided rotatably about the rotational axis A extending in the direction along the axial direction D1 and is provided outside the side surface 102*c* with respect to a radial direction perpendicular to the rotational axis A. An inside surface of the pack-side shutter 103, i.e., a surface opposing the side surface 102*c* is a curved surface extending along the side surface 102*c* of the nozzle 102, and a rectangular pack-side seal 105 is mounted on the curved surface.

The pack-side shutter 103 is constituted so as to be rotatable between a shielding position where the pack-side seal 105 shields the discharging port 102*a* of the nozzle 102 and an open position where the discharging port 102*a* is open. When the pack-side shutter 103 is in the open position, the discharging port 102*a* of the nozzle 102 is exposed from an opening 103*a* provided in a body section 103*d* of the pack-side shutter 103. Further, as shown in FIG. 3 and part (a) of FIG. 5, when the pack-side shutter 103 is in the shielding position, at least a part of the recessed portion 102*e* of the nozzle 102 is exposed from the pack-side shutter 103 through the opening 103*a*. On a side opposite from the opening 103*a* of the pack-side shutter 103, a portion 103*b* to which drive is transmitted, engageable with a drive transmitting portion 108*a* of an operating lever 108 (described later), is provided.

When the pack-side shutter 103 positioned in the shielding position shown in part (a) of FIG. 5 is rotated about the rotational axis A in an arrow K direction, the pack-side shutter 103 reaches the open position shown in part (b) of FIG. 5. On the contrary, when the pack-side shutter 103 positioned in the open position is rotated in an arrow L direction, the pack-side shutter 103 reaches the shielding position. In a rotating operation of the pack-side shutter 103, the pack-side shutter 103 slides on the side surface 102*c* of the nozzle 102 through the pack-side seal 105.

[Mounting Portion]

Next, a constitution of the mounting portion 106 on which the toner pack 100 is rotated will be described using FIGS. 6 to 9. In this embodiment, the mounting portion 106 is a unit for permitting mounting of the toner pack 100, and is provided in the image forming apparatus 1 (see, part (a) of FIG. 1). Specifically, the mounting portion 106 is connected to the developing container 32 of the image forming apparatus 1.

FIG. 6 is an exploded perspective view of the mounting portion 106. Parts (a) and (b) of FIG. 7 are exploded perspective views showing an air-permeable sheet 112 and an air-permeable filter 116. Part (a) of FIG. 8 is a top view showing the mounting portion 106 including the operating lever 108 positioned in a closed position, and part (b) of FIG. 8 is a top view showing the mounting portion 106 including the operating lever 108 positioned in an open position. FIG. 9 is a sectional view showing an H-H cross section of part (a) of FIG. 8.

As shown in FIGS. 6 to 9, the mounting portion 106 includes a main body base portion 3, the operating lever 108, and an apparatus-side shutter 109. The main body base portion 3 includes a first frame 107, a second frame 117, a cover member 110, a shutter sheet 121, the air-permeable sheet 112, and the air-permeable filter 116. The first frame 107 and the second frame 117 constitute a frame 150, and the frame 150 is constituted as a member provided separately from the developing container 32 and restricts movement of the apparatus-side shutter 109 in an axial direction D2. That is, the developing container 32 is constituted as a member provided separately from the mounting portion 106.

The cover member 110 and the second frame 117 are fixed to the first frame 107. Incidentally, the first frame 107, the cover member 110, and the second frame may also be constituted as an integral member, not the separate members. The second frame 117 is provided with an apparatus-side opening 117*a*, and the apparatus-side opening 117*a* communicates with the accommodating portion 36 (see, part (a) of FIG. 1) of the developing container 32.

Each of the operating lever 108 and the apparatus-side shutter 109 is mounted to the main body base portion 3 so as to be rotatable about a rotational axis B as a shutter rotational axis. The first frame 107 is provided with a positioning portion 107*a*. The positioning portion 107*a* projects inward from an inner peripheral surface 107*c* of the first frame 107, the center of which is the rotational axis B of the first frame 107 with respect to a radial direction perpendicular to the rotational axis B.

Further, the operating lever 108 is provided with a supplying port 32*a*, the drive transmitting portion 108*a*, and an operating portion 108*b*. The drive transferring portion 108*a* of the operating lever 108 is a projected portion projecting inward from an inner peripheral surface the center of which is the rotational axis B of the operating lever 108 with respect to the radial direction perpendicular to the rotational axis B.

The user is capable of rotating the operating lever 108 about the rotational axis B relative to the main body base portion 3 by operating the operating portion 108*b*. Specifically, the operating lever 108 is constituted so as to be rotatable between a closed position shown in part (a) of FIG. 8 and an open position shown in part (b) of FIG. 8. Although described later, when the operating lever 108 is positioned in the closed position, the pack-side shutter 103 and the apparatus-side shutter 109 are positioned in the shielding positions. Then, when the operating lever 108 is operated from the closed position to the open position, the pack-side shutter 103 and the apparatus-side shutter 109 are moved to the open positions.

The apparatus-side shutter 109 as a shutter includes an inner peripheral surface 109*h*, a receiving port 109*a* formed in the inner peripheral surface 109*h* for receiving the toner supplied from the toner pack 100, an outer peripheral surface 109*f*, and a portion 109*e* to which the drive is transmitted. To the inner peripheral surface 109*h*, an apparatus-side shutter 111 is applied so as to surround a periphery of the receiving port 109*a*. The portion 109*e* to which the drive is transmitted is engageable with the portion 103*b*, to which the drive is transmitted, of the pack-side shutter 103. The apparatus-side shutter 109 is supported so that the outer peripheral surface 109*f* is slidable with the inner peripheral surface of the first frame 107.

The apparatus-side shutter 109 is constituted so as to be moved between the shielding position and the open position relative to the main body base portion 3. As regards the apparatus-side shutter 109, the receiving port 109*a* is shielded by the apparatus-side shutter 111 and the cover member 110 in the shielding position, and the receiving port 109*a* is opened in the open position without being covered with the cover member 110. That is, the receiving port 109*a* does not communicate with the apparatus-side opening 117*a* of the second frame 117 when the apparatus-side shutter 109 is positioned in the shielding position, and communicates with the apparatus-side opening 117*a* of the second drive 117 when the apparatus-side shutter 109 is positioned in the open position. The apparatus-side shutter 109 is moved to the open position, whereby the toner can be replenished (supplied) from the toner pack 100 to the accommodating portion 36 of the developing container 32 through the receiving port 109*a*.

Incidentally, the operating lever 108 and the apparatus-side shutter 109 are not drive-connected to each other, and therefore, even when the operating lever 108 is operated in a state in which the toner pack 100 is not mounted, the apparatus-side shutter 109 is not rotated.

As shown in FIG. 6 to part (b) of FIG. 7, the first frame 107 is provided with a through hole 107*b* as a first through hole, an air-permeable sheet bearing surface 107*d*, and a restricting surface 107*e*. To the air-permeable sheet bearing surface 107*d*, the air-permeable sheet 112 is thermally welded and is disposed so as to cover the through hole 107*b*. In this embodiment, the air-permeable sheet 112 is constituted by a nonwoven fabric, but may be formed with a material other than the nonwoven fabric. Incidentally, the air-permeable sheet 112 as a first filter may also be attached to the air-permeable sheet bearing surface 107*d* by a method other than the thermal welding, and may be attached to the air-permeable sheet bearing surface 107*d* by an adhesive or the like, for example.

The second frame 117 is provided with a wall portion 117*b* and a restricting surface 117*d* in addition to the above-described apparatus-side opening 117*a*. As regards the apparatus-side shutter 109, movement thereof along the rotational axis B in the axial direction D2 is restricted by the restricting surface 107*e* of the first frame 107 and the restricting surface 117*d* of the second drive 117. In other words, the first frame 107 restricts the movement of the apparatus-side shutter 109 in the axial direction D2 on one side, and the second frame 117 restricts the movement of the apparatus-side shutter 109 in the axial direction D2 on the other side.

The wall portion 117*b* is provided with a through hole 117*c* as a second through hole, and the air-permeable filter 116 is attached to the wall portion 117*b* so as to cover the through hole 117*c*. In this embodiment, the air-permeable filter 116 as a second filter is constituted by a urethane form, i.e., a urethane material, but may also be formed with a material other than the urethane material, and may preferably be formed with a material different from the material of the air-permeable sheet 112.

A part of a surface 116*a* of the air-permeable filter 116 on a side where the toner contacts the air-permeable filter 116 is adhesively bonded to the wall portion 117*b* by an unshown double-side tape. The air-permeable sheet 112 and the air-permeable filter 116 are provided so as to cover the through holes 107*b* and 117*c* and constitute a filter portion 140 for permitting passing of the air. The through holes 107*b* and 117*c* are constituted so as to open upward. As shown in FIG. 14, the image form portion 140 constituted by the air-permeable sheet 112 and the air-permeable filter 116 is disposed so as to be sandwiched between the first frame 107 and the second frame 117. A thickness of the air-permeable filter 116 may preferably be 90 μm to 250 μm, and a thickness of the air-permeable sheet 112 may preferably be 1 mm to 20 mm.

Incidentally, the air-permeable filter 116 is coarser in mesh and higher in air permeability than the air-permeable sheet 112. The air permeability of the air-permeable sheet 112 and the air-permeable filter 116 is measured by a Frazier form method, for example. The Frazier form method is performed in the following manner. First, five test pieces each having a size of about 200 mm×200 mm are prepared and attached to a Frazier form test machine. Then, a suction fan and air holes are adjusted so that an inclined barometer indicates a pressure of 125 Pa, and a pressure indicated by a vertical barometer at that time is measured. Then, from the measured pressure and a kind of the air holes, an air capacity (amount) ($cm^3/cm^2 \cdot sec$) of the air passing through the test pieces is acquired by a conversion table attached to the test machine. It is understood that the air permeability is better with a larger air capacity of the air passing through the test pieces.

[Mounting of Toner Pack onto Mounting Portion]

Next, a state in which the toner pack 100 is mounted onto the mounting portion 106 will be described using part (a) of FIG. 10 to part (b) of FIG. 11. Part (a) of FIG. 10 is a perspective view showing a state in which the toner pack 100 is mounted onto the mounting portion 106, and part (b) of FIG. 10 is another perspective view showing the state in which the toner pack 100 is mounted onto the mounting portion 106. In these parts (a) and (b) of FIG. 10, the operating lever 108 is positioned in the closed position, and the pack-side shutter 103 and the apparatus-side shutter 109 are positioned in the shielding positions. Part (a) of FIG. 11 is a top view showing the toner pack 100 and the mounting portion 106 when the operating lever 108 is positioned in the closed position, and part (b) of FIG. 11 is a top view showing the toner pack 100 and the mounting portion 106 when the operating lever 108 is positioned in the open position.

First, the user mounts the toner pack 100 onto the mounting portion 106 being in a state in which the apparatus-side shutter 109 is positioned in the shielding position, by moving the toner pack 100, being in a state in which the pack-side shutter 103 is positioned in the shielding position, in a mounting direction N. At this time, the user positionally aligns the recessed portion 102*e* of the nozzle 102 and the opening 103*a* of the pack-side shutter 103 with the positioning portion 107*a* of the first frame 107. At the same time, the user also aligns the portion 103*b*, to which the drive is transmitted, of the pack-side shutter 103 with the drive transmitting portion 108*a* of the operating lever 108.

After such positional alignment of the toner pack 100 with the mounting portion 106, the user gradually mounts the toner pack 100 onto the mounting portion 106 by moving the toner pack 100 in the mounting direction N. Then, the portion 103*b*, to which the drive is transmitted, of the pack-side shutter 103 engages with the portion 109*b*, to which the drive is transmitted, of the apparatus-side shutter 109 and the drive transmitting portion 108*a* of the operating lever 108. By this, the rotational axis A of the pack-side shutter 103 and the rotational axis B of the apparatus-side shutter 109 are substantially coaxial with each other. Further, the recessed portion 102*e* of the nozzle 102 engages with an end surface of the cover member 110, so that the nozzle 102 of the toner pack 100 does not rotate relative to the main body base portion 3 including the cover member 110.

Then, the operating lever 108, the pack-side shutter 103, and the apparatus-side shutter 109 are rotatable relative to the main body base portion 3 and the nozzle 102 substantially integral about the rotational axes A and B.

For example, as shown in parts (a) and (b) of FIG. 11, when the operating lever 108 is rotated from the closed position to the open position in the arrow D direction, the drive transmitting portion 108*a* of the operating lever 108 presses the portion 103*b*, to which the drive is transmitted, of the pack-side shutter 103. By this, the pack-side shutter 103 is rotated together with the operating lever 108 from the shielding position to the open position. Further, the portion 103*b*, to which the drive is transmitted, of the pack-side shutter 103 rotated from the shielding position to the open position presses, the portion 109*e*, to which the drive is transmitted, of the apparatus-side shutter 109. By this, the apparatus-side shutter 109 is rotated together with the pack-side shutter 103 from the shielding position to the open position. Therefore, the pouch 101 of the toner pack 100 and the accommodating portion 36 communicate with each other through the discharging port 102*a*, the receiving port 109*a*, and the apparatus-side opening 117*a*.

On the contrary, when the operating lever 108 is rotated from the open position to the closed position, the drive transmitting portion 108*a* of the operating lever 108 presses the portion 103*b*, to which the drive is transmitted, of the pack-side shutter 103. By this, the pack-side shutter 103 is rotated together with the operating lever 108 from the open position to the shielding position. Further, the portion 103*b*, to which the drive is transmitted, of the pack-side shutter 103 rotated from the open position to the shielding position presses, the portion 109*e*, to which the drive is transmitted, of the apparatus-side shutter 109. By this, the apparatus-side shutter 109 is rotated together with the pack-side shutter 103 from the open position to the shielding position.

Thus, by operating the operating lever 108, the pack-side shutter 103 and the apparatus-side shutter 109 can be rotated between the shielding position and the open position, so that the supply of the toner from the toner pack 100 to the developing container 32 can be carried out. When the supply of the toner from the toner pack 100 to the developing container 32 is completed, the user rotates the operating lever 108 from the open position to the operating lever position, and then pulls out the toner pack 100 from the mounting portion 106.

[Toner Supply]

Next, the supply of the toner from the toner pack 100 to the developing container 32 will be specifically described using FIGS. 12 to 15. FIG. 12 is a sectional view showing a J-J cross section of part (b) of FIG. 11. That is, in FIG. 12, the operating lever 108 is positioned in the open position, and the pack-side shutter 103 and the apparatus-side shutter 109 are positioned in the open position. FIG. 13 is a sectional view showing a course E2 of a flow passage E in a form different from a form of FIG. 12. FIG. 14 is an enlarged sectional view showing the air-permeable sheet 112 and the air-permeable filter 116. FIG. 15 is a sectional view showing the process unit 20 and the toner pack 100. Incidentally, FIGS. 12 to 15 are schematic views in which the respective portions are viewed in an axial direction D4 (see, FIG. 15) of the roller axis 31*a* of the developing roller 31 and in the horizontal direction.

As shown in FIG. 12, the pouch 101 of the toner pack 100 and the accommodating portion 36 of the developing container 32 communicate with each other through the discharging port 102*a*, the receiving port 109*a*, and the apparatus-side openings 117*a*. In this state, the user compresses the pouch 101, so that the toner accommodated in the pouch 101 of the toner pack 100 is supplied to the accommodating portion 36. In the mounting portion 106, a hollow passage 400 formed so that the toner and the air are capable of passing through the hollow passage 400, and in FIG. 12, the flow passage E shows a flow of the toner from the toner pack 100 toward the accommodating portion 36. Incidentally, the passage 400 is principally formed by an inner wall of the first frame 107 and an inner wall of the second frame 117.

Specifically, as regards the flow passage E, the toner goes from the pouch 101 toward an inside of the nozzle 102 in a direction of gravitation (gravitational direction) G (course E1), and then goes toward the discharging port 102*a* and the receiving port 109*a* while being guided by a guiding surface 102*f* which is an inner wall of the nozzle 102 (course E2). The guiding surface 102*f* extends so that the guiding surface 102*f* is closer to the receiving port 109*a* toward a lower portion with respect to the horizontal direction and so that the guiding surface 102*f* is inclined with respect to the direction of gravitation G. Then, the toner runs against the surface 116*a* of the air-permeable filter 116 and goes in the direction of gravitation G (course E3), and then is supplied toward the accommodating portion 36.

Incidentally, when the toner is supplied form the toner pack 100 to the accommodating portion 36, the pouch 101 is deformed so that an inside volume thereof is decreased by being compressed. For this reason, the air in the toner pack 100 passes together with the toner accommodated in the toner pack 100 through the flow passage E and goes toward the accommodating portion 36. That is, a part of the air in which the toner is mixed goes along the courses E1 and E2 which constitute the flow passage E, and then is discharged into the mounting portion 106 through the discharging port 102*a* and the receiving port 109*a*. Then, the air passes through the through hole 117*c* and reaches the air-permeable filter 116.

At this time, the toner is collected by the air-permeable filter 116, and a part of remaining air passes through the air-permeable filter 116 and the air-permeable sheet 112. Then, the air passes through the through hole 107*b* as indicated by a flow passage F and is thus discharged to an outside of the mounting portion 106. The part of the air is discharged to the outside of the mounting portion 106 through the through hole 107*b*, whereby an amount of the air discharged into the accommodating portion 36 is suppressed, so that an increase in internal pressure of the accommodating portion 36 can be suppressed. For this reason, the user easily compresses the pouch 101 of the toner pack 100 and a toner supplying property to the accommodating portion 36 can be improved.

Here, with respect to the axial direction D2, a region where the receiving port 109*a* is present is a region X, a region where the through hole 107*b* is present is a region Y, and a region where the region X and the region Y overlap with each other is a region Z. Incidentally, in a state in which the toner pack 100 is mounted on the mounting portion 106, the axial direction D2 is substantially parallel to the direction of gravitation G. That is, the rotational axes A and B extend in the direction of gravitation G. As described above, by the pressure when the user deforms the pouch 101, the part of the air in which the toner is mixed passes through the receiving port 109*a*. That is, the air passes through the region X. Further, the part of the air passed through the receiving port 109*a* passes through the through hole 107*b* as indicated by the flow passage F, and thus is discharged to the outside of the mounting portion 106. That is, the air passes through the region Y.

In this embodiment, with respect to the axial direction D2, the region X and the region Y overlap with each other in the region Z. In other words, as shown in FIGS. 12 and 15, at least a part of the through hole 107*b* overlaps with the receiving port 109*a* in the case where the through hole 107*b* and the receiving port 109*a* are viewed in the horizontal direction, i.e., in a direction perpendicular to each of, for example, the direction of gravitation G and the axial direction D4 of the roller axis 31*a* of the developing roller 31. The direction perpendicular to each of the direction of gravitation G and the axial direction D4 of the roller axis 31*a* of the developing roller 31 is a front-rear direction of the image forming apparatus 1. Similar to the through hole 107*b*, at least a part of the through hole 117*c* overlaps with the receiving port 109*a* as viewed in the horizontal direction. Further, the through holes 107*b* and 117*c* are disposed above a connecting portion 117*e* between the mounting portion 106 and the developing container 32. The connecting portion 117*e* is a portion where the second frame 117 and the developing container 32 are connected with each other by screws or the like.

Further, at least a part of the through holes 107*b* and 117*c* is positioned between the receiving port 109*a* and the roller axis 31*a* of the developing roller 31 with respect to the direction of gravitation G. Further, at least a part of the through hole 107*b* and 117*c* is positioned between the receiving port 109*a* and the rotational axis 34*a* of the stirring member 34 with respect to the direction of gravitation G. The through holes 107*b* and 117*c* are positioned below the supplying port 32*a* through which the toner pack 100 is inserted and above the roller axis 31*a* of the developing roller 31 in the case where the through holes 107*b* and 117*c* are viewed in a direction (the axial direction D4 of the developing roller 31) perpendicular to the rotational axis A. Further, the through holes 107*b* and 117*c* are positioned below the supplying port 32*a* through which the toner pack 100 is inserted and above the rotational axis 34*a* of the stirring member 34.

Here, in FIG. 15, a rectilinear line passing through the supplying port 32*a* and extending in the horizontal direction is a rectilinear line L1, a rectilinear line passing through the roller axis 31*a* and extending in the horizontal direction is a rectilinear line L2, and a rectilinear line passing through the rotational axis 34*a* and extending in the horizontal direction is a rectilinear line L3. Further, a rectilinear line passing through a lower end of the receiving port 109*a* and extending in the horizontal direction is a rectilinear line L4, and a rectilinear line passing through the receiving port 109*a* and extending in the direction of gravitation G (vertical direction) is a rectilinear line L5. Further, a rectilinear line passing through the roller axis 31*a* and extending in the direction of gravitation G is a rectilinear line L6, and a rectilinear line passing through the rotational axis 34*a* and extending in the direction of gravitation G is a rectilinear line L7.

At least a part (for example, a region of the region Y other than the region Z in FIG. 12) of the through holes 107*b* and 117*c* is positioned between the rectilinear lines L4 and L2 and between the rectilinear lines L4 and L3.

The through holes 107*b* and 117*c* are positioned below the rectilinear line L1 and above the rectilinear lines L2 and L3. Incidentally, such conditions are not always required to be satisfied by all portions of the through holes 107*b* and 117*c*, but at least a part of the through holes 107*b* and 117*c* may only be required to be positioned below the supplying port 32*a* and above the roller axis 31*a* of the developing roller 31 and the rotational axis 34*a* of the stirring member 34.

Further, with respect to the horizontal direction, the through holes 107*b* and 117*c* are positioned between the receiving port 109*a* and the roller axis 31*a*. That is, the through holes 107*b* and 117*c* are positioned between the rectilinear lines L5 and L6. Further, with respect to the horizontal direction, the through holes 107*b* and 117*c* are positioned between the receiving port 109*a* and the rotational axis 34*a*. That is, the through holes 107*b* and 117*c* are positioned between the rectilinear lines L5 and L7. Incidentally, such conditions are not always required to be satisfied by all portions of the through holes 107*b* and 117*c*, but at least a part of the through holes 107*b* and 117*c* may only be required to be positioned, with respect to the horizontal direction, between the receiving port 109*a* and the roller axis 31*a* and between the receiving port 109*a* and the rotational axis 34*a*.

As shown in part (a) of FIG. 1 and FIG. 15, the roller axis 31*a* of the developing roller 31, the rotational axis 34*a* of the stirring member 34, the through holes 107*b* and 117*c*, and the receiving port 109*a* are arranged in a named order with respect to the discharging direction DD.

Thus, by disposing the through holes 107*b* and 117*c* in the positions as described above, a part of the air in which the toner is mixed can be efficiently discharged to the outside of the mounting portion 106, so that it is possible to suppress an increase in internal pressure of the accommodating portion 36. By this, the toner supplying property can be improved. In addition, the through hole 107*b* is disposed above the connecting portion 117*e*, so that the toner once accommodated in the developing container 32 can be reduced in degree of flow-back thereof into the through hole 107*b*.

Further, the air in which the toner is mixed runs against the surface 116*a* of the air-permeable filter 116, but the surface 116*a* is disposed so as to not only face the receiving port 109*a* but also be inclined with respect to the direction of gravitation G so that the surface 116*a* is away from the receiving port 109*a* downward with respect to the horizontal direction. Similarly, a wall 400*a* (see, FIG. 15) of the passage 400 provided with the through holes 107*b* and 117*c* is inclined downward in the direction of gravitation G with an increasing distance from the receiving port 109*a* toward the developing roller 31 with respect to the horizontal direction. For this reason, the air-permeable filter 116 collects the toner, and then easily causes the collected toner to fall in the direction of gravitation G, i.e., toward the accommodating portion 36. Therefore, clogging of the air-permeable filter 116 is suppressed, so that performance of the air-permeable filter 116 can be maintained. A frequency of exchange of the air-permeable filter 116 is suppressed, so that it is possible to reduce a maintenance cost and a component part exchange cost.

The air-permeable filter 116 and the air-permeable sheet 112 are mounted on the second frame 117 and the first frame 107, respectively, without via a seal or the like as shown in FIG. 14. The air-permeable sheet 112 is finer in mesh than the air-permeable filter 116 and is disposed on a side opposite from the passage 400 with respect to the air-permeable filter 116. For this reason, even when the toner passes through the air-permeable filter 116, the toner is collected by the air-permeable sheet 112, so that it is possible to reduce a degree of scattering of the toner to the outside of the mounting portion 106 through the through holes 117*c* and 107*b*.

Incidentally, in FIG. 12, the course E2 of the flow passage E is schematically illustrated, and the course E2 was described so that a direction thereof is changed to one point. FIG. 13 illustrates the course E2 of the flow passage E more smoothly, and the guiding surface 102*f* of the nozzle 102 guides the toner and the air along the course E2. In the course E2, the air goes through the receiving port 109*a* in an air entrance direction D3. That is, the air is guided through the receiving port 109*a* in the air entrance direction by the guiding surface 102*f*.

At that time, at least a part of the through hole 107*b* opposes the receiving port 109*a* with respect to the air entrance direction. For this reason, the part of the air in which the toner is mixed can be efficiently discharged to the outside of the mounting portion 106 through the through hole 107*b*, so that the increase in internal pressure of the accommodating portion 36 can be suppressed.

Second Embodiment

Next, although a second embodiment of the present invention will be described, in the second embodiment, the constitution of the filter portion 140 in the first embodiment is changed. For this reason, constituent elements similar to those in the first embodiment will be omitted from illustration or will be described by adding the same reference numerals or symbols to the figures.

FIG. 16 in an exploded perspective view showing a mounting portion 2106 in the second embodiment. FIG. 17 is a sectional view showing the mounting portion 2106. Incidentally, a cross section of FIG. 17 is similar to the H-H cross section of part (a) of FIG. 8. FIG. 18 is a top view showing the mounting portion 2106. FIG. 19 is a sectional view showing a filter portion 2140. FIG. 20 is a schematic view showing a structure of a periphery of the filter portion 2140.

As shown in FIGS. 16 and 17, the filter portion 2140 in this embodiment includes an air-permeable sheet 112 as a third filter, a scattering preventing sheet 2113 as a fourth filter, a double side tape 2114, and an auxiliary scattering preventing sheet 2115. Incidentally, other constituent elements of the mounting portion 2106 other than the filter portion 2140 are similar to those of the mounting portion 106 in the first embodiment.

The first frame 107 and the second frame 117 of the frame 150 are provided with the through holes 107*b* and 117*c*, respectively. Similarly, as in the first embodiment, the air-permeable sheet 112 is thermally welded and fixed to the air-permeable sheet bearing surface 107*d* provided at an inner surface of the first frame 107. The scattering preventing sheet 2113 is fixed on a scattering preventing sheet bearing surface 107*g* provided at an outer surface of the first frame 107 by an unshown double-side tape or an unshown adhesive. At a center portion of the scattering preventing sheet 2113, a hole 2113*h* which is a through hole is provided.

On the scattering preventing sheet 2113, an auxiliary scattering preventing sheet 2115 is integrally fixed by a U-shaped double-side tape 2114. The double-side tape 2114 is attached onto the scattering preventing sheet 2113 so as not to overlap with the hole 2113*h* of the scattering preventing sheet 2113. Incidentally, in this embodiment, as the auxiliary scattering preventing sheet 2115, a filter material similar to the filter material of the air-permeable sheet 112 is used, and air permeability thereof is 2-80 cc/cm$^2$. Further, the scattering preventing sheet 2113 is a filter material or a sheet material, with a thickness in a range of 25 μm to 3.0 mm, for example, and is smaller in toner passing amount than the air-permeable sheet 112 and the auxiliary scattering preventing sheet 2115. Of the toner running against a portion of the scattering preventing sheet 2113 other than the hole 2113*h*, little passes through the scattering preventing sheet 2113.

Each of the air-permeable sheet 112, the scattering preventing sheet 2113, and the auxiliary scattering preventing sheet 2115 has an area broader than the through hole 107*b*, and is provided so as to cover the through hole 107*b*. The auxiliary scattering preventing sheet 2115 as a fifth filter is disposed on a side opposite from the air-permeable sheet 112 and the passage 400 with respect to the scattering preventing sheet 2113. That is, the air-permeable sheet 112, the scattering preventing sheet 2113, and the auxiliary scattering preventing sheet 2115 are disposed so as to overlap with the through hole 107*b* when the user views the through hole 107*b* from the front side. Further, the air-permeable sheet 112 and the auxiliary scattering preventing sheet 2115 cover the hole 2113*h* of the scattering preventing sheet 2113.

Further, the double-side tape 2114 includes a first rectilinear line portion 2114*a*, a second rectilinear line portion 2114*b*, and a third rectilinear line portion 2114*c* connecting the first rectilinear line portion 2114*a* and the second rectilinear line portion 2114*b*, and is formed in the U-shape. That is, the double-side tape 2114 is formed in the U-shape, and thus is positioned only at a part of a periphery of the hole 2113*h*, so that the double-side tape 2114 is not disposed at a full circumference of the periphery of the hole 2113*h*. In other words, the double-side tape 2114 opens in one direction and forms an open portion 2114*f*.

Thus, at a portion where the double-side tape 2114 is present, the scattering preventing sheet 2113 and the auxiliary scattering preventing sheet 2115 are bonded, but are not bonded at the open portion 2114*f*. For this reason, as shown in FIG. 18, a constitution in which the air easily escapes in an arrow K direction from a minute gap between the scattering preventing sheet 2113 and the auxiliary scattering preventing sheet 2115 in a position corresponding to the open potion 2114*f* is employed. In other words, the double-side tape 2114 is constituted so that the air passed through the hole 2113*h* passes through between the scattering preventing sheet 2113 and the auxiliary scattering preventing sheet 2115 from the open portion 2114*f* which is a portion where the double-side tape 2114 is not positioned. The arrow K direction is from the hole 2113*h* toward the open portion 2114*f*.

Incidentally, as described above, during supply of the toner, the toner passes together with the air through the air-permeable sheet 112 in a small amount in some cases. At this time, as shown in FIG. 19, the toner passed through the air-permeable sheet 112 from a portion which does not oppose the hole 2113*h* runs against the scattering preventing sheet 2113, and is accumulated in a gap 107*f* formed between the air-permeable sheet 112 and the auxiliary scattering preventing sheet 2115 as shown at T. The scattering preventing sheet 2113 and the auxiliary scattering preventing sheet 2115 are disposed so as to sandwich the through hole 107*b*, and the gap 107*f* in a part of a space formed by the through hole 107*b*. In other words, the air-permeable sheet 112 and the scattering preventing sheet 2113 are disposed so that the gap 107*f* is positioned between the air-permeable sheet 112 and the scattering preventing sheet 2113 and below the hole 2113*h*.

On the other hand, the toner passed through the air-permeable sheet 112 from a portion opposing the hole 2113*h* is a very small amount, and passes through the hole 2113*h* and then is deposited on the auxiliary scattering preventing sheet 2115. By this, it is possible to reduce a degree of scattering of the toner, passed through the through holes 117*c* and 107*b*, to the outside of the mounting portion 2106. Particularly, during transportation in which the image forming apparatus 1 is transported or during supply of the toner from the toner pack 100 to the developing container 32, the toner in the developing container 32 is liable to rise into the air, but the scattering of the toner to the outside of the mounting portion 2106 can be reduced by the above-described filter portion 2140. Incidentally, the flow of the toner described above is merely an example, for example, the toner passed through the air-permeable sheet 112 from a portion opposing the hole 2113*h* runs against the scattering preventing sheet 2113 and then may be accumulated in the gap 107*f*.

Most of the air passed through the air-permeable sheet 112 passes through the hole 2113*h* of the scattering preventing sheet 2113. The scattering preventing sheet 2113 is provided with the hole 2113*h*, and therefore, is good in air permeability, so that the internal pressure of the accommodating portion 18 can be effectively reduced. Incidentally, when the air can sufficiently pass through the hole 2113*h*, a shape and a size of the hole 2113*h* are not limited, but the hole 2113*h* may suitably be a circular hole of 2 mm to 15 mm in diameter. Further, the hole 2113*h* may also be a polygonal hole such as a rectangular hole, for example.

The air passed through the scattering preventing sheet 2113 and run against the auxiliary scattering preventing sheet 2115 is discharged in the arrow K direction through the open portion 2114*f* of the double-side tape 2114. Specifically, this air is discharged in the arrow K direction from between the scattering preventing sheet 2113 and the auxiliary scattering preventing sheet 2115 in the open portion 2114*f*. This air contains little toner. Incidentally, in the case where an air-permeable filter material is used as the auxiliary scattering preventing sheet 2115, a part of the air passes through the auxiliary scattering preventing sheet 2115 and then may be discharged to the outside the mounting portion 2106.

As shown in FIG. 20, in plan view in which the image forming apparatus 1 is viewed from above, the photosensitive drum 21 is disposed on a rear side of the filter portion 2140, and the supplying port 32*a* for permitting mounting of the toner pack therethrough is disposed on a front side of the filter portion 2140. Further, the scanner unit 11 as an exposure portion is disposed on a right-hand side of the filter portion 2140, and a left side plate 401 of the apparatus main assembly 2 is disposed on a left-hand side of the filter portion 2140. The left side plate 401 is a part of the frame of the apparatus main assembly 2. In other words, the first rectilinear line portion 2114*a* of the double-side tape 2114 is disposed between the hole 2113*h* of the scattering preventing sheet 2113 and the photosensitive drum 21. The second rectilinear line portion 2114*b* is disposed between the hole 2113*h* and the supplying port 32*a*. The third rectilinear line portion 2114*c* is disposed between the hole 2113*h* and the scanner unit 11.

The above-described arrow K direction is a direction from the filter portion 2140 toward the left-hand side, i.e., toward the left side plate 401. The toner is little contained in the air discharged through the open portion 2114*f* in the arrow K direction, but there is a possibility that the toner in a very small amount is contained in the air. When the toner is deposited on the photosensitive drum 21 and the scanner unit 11 disposed on the rear side and the right-hand side, respectively, of the filter portion 2140, there is a possibility that improper image formation is caused to occur.

Further, when the toner is deposited on the supplying port 32*a* disposed on the front side of the filter portion 2140, there is a possibility that the toner is deposited on the user during the supply of the toner by the user. For this reason, in this embodiment, a constitution in which the air is discharged from the open portion 2114*f* toward the left side plate 401 in the arrow K direction was employed. Between the left side plate 401 and the open portion 2114*f*, there is no constitution causing the improper image formation and the toner deposition on the user, and therefore the improper image formation and the toner deposition on the user can be suppressed. Incidentally, the left side plate 401 may suitably be appropriately provided with an opening for permitting escape of the air therethrough.

As described above, in this embodiment, a constitution in which the frame 150 constituting the passage 400 through which the toner passes during the toner supply is provided with the through holes 107*b* and 117*c* and in which the through hole 107*b* is covered with the filter portion 2140 was employed. Further, during the toner supply, the pouch 101 of the toner pack 100 is compressed, so that the air passes together with the toner through the passage 400. This air passes through the through holes 107*b* and 117*c* and the filter portion 2140 and is discharged to the outside of the mounting portion 2106, and therefore, the increase in internal pressure of the accommodating portion 36 can be suppressed, so that the toner supplying property can be improved.

Further, the filter portion 2140 is constituted by the air-permeable sheet 112, the scattering preventing sheet 2113, the double-side tape 2114, and the auxiliary scattering preventing sheet 2115. The toner contained in the air is collected successively by the air-permeable sheet 112, the scattering preventing sheet 2113, and the auxiliary scattering preventing sheet 2115, so that the degree of the scattering of the toner to the outside of the mounting portion 2106 can be reduced.

Further, the double-side tape 2114 adhesive for bonding the scattering preventing sheet 2113 and the auxiliary scattering preventing sheet 2115 together is formed in the U-shape, and therefore, most of the air passed through the scattering preventing sheet 2113 is discharged in the arrow K direction through the open portion 2114*f* of the double-side tape 2114. Further, the scattering preventing sheet 2113 is provided with the hole 2113*h*, and therefore, the air permeability is good. By this, the air permeability of the filter portion 2140 is improved, so that it is possible to effectively suppress the increase in internal pressure of the accommodating portion 36.

Further, the air discharged in the arrow K direction through the open portion 2114*f* goes toward the left side plate 401, and therefore, it is possible to suppress the improper image formation and the toner deposition on the user.

OTHER EMBODIMENTS

Incidentally, in the first embodiment, the region where the receiving port 109*a* is present with respect to the axial direction D2 was the region X, but a region where the discharging port 102*a* is present may be the region X. That is, the discharging port 102*a* and the through hole 107*b* are disposed so as to overlap with each other with respect to the axial direction D2, so that the air can be efficiently discharged from the mounting portion 106.

Further, in the first embodiment, the air-permeable sheet 112 and the air-permeable filter 116 were disposed so as to be sandwiched between the first frame 107 and the second frame 117, but the present invention is not limited thereto. That is, the air-permeable sheet 112 and the air-permeable filter 116 may only be required to be disposed so as to cover at least one of the through holes 107*b* and 117*c*, and for example, the air-permeable filter 116 may be disposed on a side closer to the passage E than the through hole 117*c* is.

Further, in the first embodiment, the filter portion 140 was constituted by two air-permeable filters consisting of the air-permeable sheet 112 and the air-permeable filter 116, but may also be constituted by a single air-permeable filter or three or more air-permeable filters.

Further, in the second embodiment, the auxiliary scattering preventing sheet 2115 was constituted by the filter material of 2-80 $cc/cm^2 \cdot sec$ in air permeability, but the present invention is not limited thereto. For example, in view of the amount of the toner passing through the air-permeable sheet 112 and the increase in internal pressure of the accommodating portion 36, as the auxiliary scattering preventing sheet 2115, a PET (polyethylene terephthalate) sheet or a PO (polyolefin), which has no air permeable performance may be used.

Further, in the second embodiment, the scattering preventing sheet 2113 and the auxiliary scattering preventing sheet 2115 were constituted as separate members from the first frame 107, but may be molded integrally with the first frame 107. However, in this case, the auxiliary scattering preventing sheet 2115 is formed with the same material as the first frame 107, and therefore, the internal pressure is increased more than in the case where a filter material having air permeability is used. For this reason, for example, as the air-permeable sheet 112, a material higher in air permeability than the air permeability same material may be used.

Further, in the second embodiment, while sandwiching the through hole 107*b*, the air-permeable sheet 112 was disposed on the passage 400 side and the scattering preventing sheet 2113 and the auxiliary scattering preventing sheet 2115 were disposed on the side opposite from the passage 400 side, but the present invention is not limited thereto. For example, the scattering preventing sheet 2113 may be disposed on the passage 400 side relative to the through hole 107*b*. In this case, the U-shaped double-side tape 2114 may adhesively bond the scattering preventing sheet bearing surface 107*g* of the first frame 107 and the auxiliary scattering preventing sheet 2115 together. Further, all the air-permeable sheet 112, the scattering preventing sheet 2113, and the auxiliary scattering preventing sheet 2115 may be provided on the scattering preventing sheet bearing surface 107*g* side of the first frame 107.

Further, in the second embodiment, the scattering preventing sheet 2113 and the auxiliary scattering preventing sheet 2115 were adhesively bonded together by the U-shaped double-side tape 2114, but the present invention is not limited thereto. For example, in place of the double-side tape, the scattering preventing sheet 2113 and the auxiliary scattering preventing sheet 2115 may be adhesively bonded together by an adhesive or the like. Further, the shape of the double-side tape is not limited to the rectangular shape, but may be an L-shape, a V-shape, or the like, for example.

Further, in either of the above-described embodiments, the frame 150 was constituted by the first frame 107 and the second frame 117, but the present invention is not limited thereto. For example, the frame 150 may be constituted by a single member or three members or more.

Further, in either of the above-described embodiments, the first frame 107 and the second frame 117 were provided with the through holes 107*b* and 117*c*, respectively, but the present invention is not limited thereto. For example, the second frame 117 may be not provided with the through hole 117*c*, and only the first frame 107 may be provided with the through hole 107*b*. That is, the through hole 107*b* may only be required to be provided in a certain place of the frame 150. In this case, the wall portion 117*b* of the second frame 117 may be omitted.

Further, in either of the above-described embodiments, the receiving port 109*a* was provided in the apparatus-side shutter 109, but the present invention is not limited thereto. For example, the receiving port 109*a* may be provided in a member different from the apparatus-side shutter 109, and the receiving port 109*a* may be shielded or opened by the apparatus-side shutter 109.

Further, in either of the above-described embodiments, the frame 150 and the developing container 32 were constituted as separate members, but the present invention is not limited thereto. That is, the frame 150 and the developing container 32 may be integrally formed with each other.

Further, in either of the above-described embodiments, the process unit 20 was mounted in the apparatus main assembly 2 so that exchange thereof is disabled, but the present invention is not limited thereto. That is, the process unit 20 may be mounted in the apparatus main assembly 2 so as to be detachably mountable to the apparatus main assembly 2.

According to the present invention, the toner supplying property can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-141732 filed on Aug. 31, 2021, and No. 2021-205884 filed on Dec. 20, 2021, which are hereby incorporated by reference herein in their entirety.

What is claimed is:

1. A developing apparatus comprising:

(i) a developing roller rotatable about a rotational axis extending in a first direction;

(ii) a frame including an accommodating portion which accommodates toner to be borne on the developing roller, the frame including:

(ii-1) first and second frame end portions disposed opposite to each other with respect to the first direction, (ii-2) a through-hole through which the accommodating portion communicates with outside of the accommodating portion and which is provided in the first frame end portion, and (ii-3) a supplying port through which a toner is supplied to the accommodating portion from outside of the developing apparatus, the supplying port being provided on the first frame end portion;

(iii) a filter attached to an outer surface of the accommodating portion so that a first surface of the filter covers the through-hole of the frame;

(iv) a sheet; and (v) a spacer provided between the sheet and a second surface of the filter opposite to the first surface to form a gap therebetween, the spacer including first and second spacer portions which extend in the first direction and align with a space in a second direction perpendicular to the first direction, and a third spacer portion extending in the second direction to connect the first spacer portion and the second spacer portion, wherein the spacer is provided with an open portion between an end of the first spacer portion and an end of the second spacer portion which are provided on a first end side of the spacer with respect to the first direction, wherein the third spacer portion of the spacer is connected to the first spacer portion and to the second spacer portion on a second end side of the spacer opposite to the first end side of the spacer with respect to the first direction, and wherein an area enclosed by the first, second, and third spacer portions overlaps with the through-hole of the frame when viewed in a third direction perpendicular to first direction and the second direction.

2. The developing apparatus according to claim 1, wherein the sheet is a first sheet, and wherein the developing apparatus includes a second sheet attached to an inner surface of the accommodating portion to face the through-hole.

3. The developing apparatus according to claim 1, wherein the sheet is formed of a polyethylene terephthalate or a polyolefin.

4. The developing apparatus according to claim 1, wherein an air permeability of the sheet is 2-80 cc/cm$^2$.

5. The developing apparatus according to claim 1, wherein the spacer adhesively bonds the filter and the sheet.

6. The developing apparatus according to claim 1, wherein when the developing apparatus is oriented in a predetermined direction in which the developing apparatus is used in an apparatus main body of an image forming apparatus, the through-hole is provided on a surface of the frame which inclines and faces upward.

7. The developing apparatus according to claim 1, wherein when the developing apparatus is oriented in a predetermined direction in which the developing apparatus is used in an apparatus main body of an image forming apparatus, the supplying port is provided above the through-hole.

8. An image forming apparatus comprising:

a photosensitive drum; and a developing apparatus including:

(i) a developing roller configured to rotate about a rotational axis extending in a first direction and to supply toner to the photosensitive drum, (ii) a frame including an accommodating portion which accommodates the toner to be borne on the developing roller, the frame including:

(ii-1) first and second frame end portions opposite to each other with respect to the first direction, (ii-2) a through-hole through which the accommodating portion communicates with outside of the accommodating portion and which is provided in the first frame end portion, and (ii-3) a supplying port through which the toner is supplied to the accommodating portion from outside of the developing apparatus, the supplying port being provided on the first frame end portion;

(iii) a filter attached to an outer surface of the accommodating portion so that a first surface of the filter covers the through-hole of the developing frame, (iv) a sheet, and (v) a spacer provided between the sheet and a second surface of the filter opposite to the first surface to form a gap therebetween, the spacer including first and second spacer portions which extend in the first direction and align in a second direction perpendicular to the first direction, and a third spacer portion extending in the second direction to connect the first spacer portion and the second spacer portion, wherein the spacer is provided with an open portion between an end of the first spacer portion and an end of the second spacer portion which are provided on a first end side of the spacer with respect to the first direction, wherein the third spacer portion of the spacer is connected to the first spacer portion and to the second spacer portion on a second end side of the spacer opposite to the first end side of the spacer with respect to the first direction, and wherein an area enclosed by the first, second, and third spacer portions overlaps with the through-hole when viewed in a third direction perpendicular to first direction and the second direction.

9. The image forming apparatus according to claim 8, further comprising:

a scanner unit configured to irradiate the photosensitive drum; and first and second side plates which align in the first direction, wherein the photosensitive drum, the developing apparatus, and the scanner unit are provided between the first and second side plates with respect to the first direction, wherein the through-hole of the frame, the sheet, and the spacer are provided closer to the first side plate than to the second side plate with respect to the first direction, and wherein the open portion of the spacer is provided closer to the first side plate than the scanner unit is.

10. The image forming apparatus according to claim 8, wherein the sheet is a first sheet, and wherein the developing apparatus includes a second sheet attached to an inner surface of the accommodating portion to face the through-hole of the frame.

11. The image forming apparatus according to claim 8, wherein the sheet is formed of a polyethylene terephthalate or a polyolefin.

12. The image forming apparatus according to claim 8, wherein an air permeability of the sheet is 2-80 $cc/cm^2$.

13. The image forming apparatus according to claim 8, wherein the spacer adhesively bonds the filter and the sheet.

14. The image forming apparatus according to claim 8, wherein the through-hole is provided on a surface of the frame which inclines and faces upward.

15. The image forming apparatus according to claim 8, wherein the supplying port is provided above the through-hole.

* * * * *